United States Patent
Pung et al.

(10) Patent No.: US 7,532,622 B2
(45) Date of Patent: May 12, 2009

(54) METHODS, DEVICES AND SOFTWARE FOR MERGING MULTICAST GROUPS IN A PACKET SWITCHED NETWORK

(75) Inventors: Hung Keng Pung, Singapore (SG); Kwang Yong Koh, Singapore (SG)

(73) Assignee: National University of Singapore, Singapore (SG)

( * ) Notice: Subject to any disclaimer, the term of this patent is extended or adjusted under 35 U.S.C. 154(b) by 832 days.

(21) Appl. No.: 10/462,435

(22) Filed: Jun. 16, 2003

(65) Prior Publication Data

US 2004/0252690 A1 Dec. 16, 2004

(51) Int. Cl.
*H04L 12/56* (2006.01)

(52) U.S. Cl. ..................... 370/390; 370/428
(58) Field of Classification Search ............ 370/328, 370/400, 432, 475, 389, 390
See application file for complete search history.

(56) References Cited

U.S. PATENT DOCUMENTS

| | | | |
|---|---|---|---|
| 5,195,086 A | | 3/1993 | Baumgartner et al. |
| 5,373,549 A | | 12/1994 | Bales et al. |
| 5,511,168 A | * | 4/1996 | Perlman et al. ............. 709/243 |
| 5,557,745 A | * | 9/1996 | Perlman et al. ............. 709/242 |
| 5,598,530 A | * | 1/1997 | Nagae ....................... 714/21 |
| 5,634,011 A | | 5/1997 | Auerbach et al. |
| 5,835,723 A | * | 11/1998 | Andrews et al. ............. 709/226 |
| 5,959,989 A | * | 9/1999 | Gleeson et al. ............. 370/390 |
| 5,973,724 A | * | 10/1999 | Riddle ....................... 348/14.07 |
| 6,046,989 A | | 4/2000 | Takahashi |
| 6,147,992 A | | 11/2000 | Giroir et al. |
| 6,240,188 B1 | * | 5/2001 | Dondeti et al. ............. 380/284 |
| 6,304,901 B1 | * | 10/2001 | McCloghrie et al. ........ 709/221 |
| 6,331,983 B1 | * | 12/2001 | Haggerty et al. ............. 370/400 |
| 6,728,715 B1 | * | 4/2004 | Astley et al. ................ 707/10 |
| 6,728,777 B1 | * | 4/2004 | Lee et al. .................... 709/238 |
| 6,788,696 B2 | * | 9/2004 | Allan et al. ................. 370/411 |
| 6,898,187 B2 | * | 5/2005 | Perlman et al. ............ 370/252 |
| 7,039,052 B2 | * | 5/2006 | Fox et al. ................... 370/390 |
| 7,065,576 B2 | * | 6/2006 | Kamel et al. ............... 709/227 |

(Continued)

FOREIGN PATENT DOCUMENTS

WO          WO 98/48343          10/1998

OTHER PUBLICATIONS

Efficient rate-controlled bulk data transfer using multiple multicast Groups; Bhattacharyya, S.; Kurose, J.F.; Towsley, D.; Nagarajan, R.; Networking, IEEE/ACM Transactions on vol. 11, Issue 6, Dec. 2003 pp. 895-907.*

(Continued)

*Primary Examiner*—Edan Orgad
*Assistant Examiner*—Salman Ahmed
(74) *Attorney, Agent, or Firm*—Dinsmore & Shohl LLP

(57) ABSTRACT

In a method of merging and disbanding multicast groups in a packet switch network multicast groups may be merged at edge routers. Merging and disbanding of multicast groups may be controlled by a designated computing device (referred to as connection managers) on each sub-network. Connection managers across sub-networks may communicate with each other to ensure merge and disband messages are properly distributed. Connection managers may optionally be interconnected hierarchically. Connection managers or other computing devices may optionally act as proxies for merged groups to ensure traffic for merged groups is directed to a sub-network.

33 Claims, 30 Drawing Sheets

U.S. PATENT DOCUMENTS

| | | | |
|---|---|---|---|
| 7,280,538 B2 * | 10/2007 | Li | 370/390 |
| 2003/0076794 A1 * | 4/2003 | Kawasaki et al. | 370/329 |
| 2003/0104807 A1 * | 6/2003 | Momona | 455/422 |
| 2003/0233540 A1 * | 12/2003 | Banerjee et al. | 713/153 |
| 2004/0131060 A1 * | 7/2004 | Newberg et al. | 370/390 |
| 2004/0184454 A1 * | 9/2004 | Shankar et al. | 370/390 |
| 2005/0080441 A1 * | 4/2005 | Dodge et al. | 606/171 |
| 2005/0089050 A1 * | 4/2005 | Cheriton | 370/397 |
| 2005/0120378 A1 * | 6/2005 | Jalonen | 725/97 |
| 2006/0080441 A1 * | 4/2006 | Chen et al. | 709/225 |
| 2006/0136780 A1 * | 6/2006 | Meng et al. | 714/13 |

OTHER PUBLICATIONS

Multicast group membership management; Auerbach, J.; Gopal, M.; Kaplan, M.; Kutten, S.; Networking, IEEE/ACM Transactions on vol. 11, Issue 1, Feb. 2003 pp. 166-175.*

A dynamic multicast grouping approach in distributed interactive simulation; Zhong-Jian Dai; Chao-Zhen Hou; Li-Min Su;☐☐Machine Learning and Cybernetics, 2002. Proceedings. 2002 International Conference on vol. 1, Nov. 4-5, 2002, pp. 540-543 vol. 1.*

Advanced join mechanism for multicast group management in DSRC-based ITS networks; Munaka, T.; Yamamoto, T.; Kuroda, M.; Watanabe, T.; Intelligent Transportation Systems, 2001. Proceedings. 2001 IEEE; Aug. 25-29, 2001 pp. 1147-1151.*

Protocol independent multicast group aggregation scheme for the global area multicast; Sejun Song; Zhi-Li Zhang; Baek-Young Choi; Du, D.H.C.; Global Telecommunications Conference, 2000. GLOBECOM '00. IEEE; vol. 1, Nov. 27-Dec. 1, 2000 pp. 370-375 vol. 1.*

One-to-many reliable data distribution using multiple multicast groups; Vasconcelos, R.; Carvalho, A.; Carrapatoso, A.; Industrial Electronics Society, 1998. IECON '98. Proceedings of the 24th Annual Conference of the IEEE; vol. 1, Aug. 31-Sep. 4, 1998 pp. 173-175 vol. 1.*

Cai Hong Zhang et al.; A Middleware for Multimedia Communication; 6th IASTED International Conference IMSA Aug. 2002.

Cai Hong Zhang et al.; A JINI/JAVA Based Streaming Frame Work For Group Communication; IEEE International Conference on Networks 2002, ICON2002, Aug. 27-30, 2002.

Sae-Whong Suthon et al.; An Adaptive End-To-End QOS Management With Dynamic Protocol Configurations; IEEE International Conference on Networks 2002, ICON2002, Aug. 27-30, 2002.

Cai Hong Zhang et al.; Octopus: An Adaptive Group Communication Environment for Multimedia Application, IEEE INternational Conference on Networks 2002, ICON2002, Aug. 27-30, 2002.

Wanjium Liao et al.; Receiver-Initiated Group Membershp Protocol (RGMP): a New Group Management Protocol for IP Multicasting; Proceedings ICNP 1999, pp. 51-58.

Hung Keng Pung et al.; Supporting Group Merging and Group Disbanding In Networks; Dept. of Computer Science; School of Computing; National University of Singapore; Jul. 23, 2002.

RFC 1112—S. Deering, Host Extensions for IP Multicasting, Stanford University, Aug. 1989.

RFC 1122—R. Braden, (Editor), Requirements for Internet Hosts—Communicatin Layers, Internet Engineering Task Force, Oct. 1989.

RFC 1812—F. Baker (Editor), Requirements for IP Version 4 Routers, Cisco Systems, Jun. 1995.

RFC 2236—W. Fenner, Internet Group Management Protocol, Version 2, Xerox PARC, Nov. 1997.

RFC 2715—D. Thaler, Interoperability Rules for Multicast Routing Protocols, Microsoft, Oct. 1999.

RFC 2933—K. McCloghrie et al.; Internet Group Management Protocol MIB, Cisco Systems/Procket Networks.Microsoft, Oct. 2000.

RFC 3228—B. Fenner, IANA Considerations for IPv4 Internet Go=roup Management Protocol (IGMP), AT&T Research, Feb. 2002.

* cited by examiner

| | SPECIFICATION OF MESSAGE TYPES | |
|---|---|---|
| | MESSAGE TYPE | CODE FIELD |
| IGMP_Merge_Request | 0x12 | 0x1 |
| IGMP_Merge_Posv_Reply | 0x12 | 0x2 |
| IGMP_Merge_Negv_Reply | 0x12 | 0x3 |
| IGMP_Disband_Request | 0x12 | 0x4 |
| IGMP_Disband_Posv_Reply | 0x12 | 0x5 |
| IGMP_Disband_Negv_Reply | 0x12 | 0x6 |

FIG. 12

| 0 | 7 8 | 15 16 | 31 |
|---|---|---|---|
| MESSAGE TYPE=0x31 | CODE FIELD=0x6 | CHECKSUM ||
| GROUP ADDRESS TO BE MERGED TO ||||
| MERGE_PORT || NUMBER OF SOURCES (N) ||
| SOURCE ADDRESS [1] ||||
| ...... ||||
| SOURCE ADDRESS [N] ||||

FIG. 27C

| 0 | 7 8 | 15 16 | 31 |
|---|---|---|---|
| MESSAGE TYPE=0x32 | CODE FIELD=0x5 | CHECKSUM ||
| GROUP ADDRESS TO BE MERGED TO ||||
| MERGE_PORT || GROUP ADDRESS OF SUB GROUP (Upper 16 bits) ||
| GROUP ADDRESS OF SUB GROUP (Lower 16 bits) || NUMBER OF SOURCES [N] ||
| SOURCE ADDRESS [1] ||||
| ...... ||||
| SOURCE ADDRESS [N] ||||

FIG. 27D

| MESSAGE TYPE=0x32 | CODE FIELD=0x7 | CHECKSUM |
|---|---|---|
| GROUP ADDRESS TO BE MERGED TO ||| 
| MERGE_PORT | GROUP ADDRESS OF SUB GROUP (Upper 16 bits) ||
| GROUP ADDRESS OF SUB GROUP (Lower 16 bits) | NUMBER OF SOURCES [N] ||
| SOURCE ADDRESS [1] |||
| ...... |||
| SOURCE ADDRESS [N] |||

FIG. 27E

| MESSAGE TYPE=0x32 | CODE FIELD=0x8 | CHECKSUM |
|---|---|---|
| GROUP ADDRESS TO BE MERGED TO |||
| MERGE_PORT | GROUP ADDRESS OF SUB GROUP (Upper 16 bits) ||
| GROUP ADDRESS OF SUB GROUP (Lower 16 bits) | NUMBER OF SOURCES [N] ||
| SOURCE ADDRESS [1] |||
| ...... |||
| SOURCE ADDRESS [N] |||

FIG. 27F

|  | SPECIFICATION OF MESSAGE TYPES ||
|  | IGMPv2 | ICMPv6 |
| --- | --- | --- |
| IGMP_Merge_Request | 0x31 | 0x141 |
| IGMP_Merge_Reply | 0x32 | 0x142 |
| IGMP_Disband_Request | 0x33 | 0x143 |
| IGMP_Disband_Reply | 0x34 | 0x144 |

FIG. 28

METHODS, DEVICES AND SOFTWARE FOR MERGING MULTICAST GROUPS IN A PACKET SWITCHED NETWORK

FIELD OF THE INVENTION

The present invention relates generally to computer networks, and more particularly to methods, devices and software for merging multicasts in a packet switched network, thereby allowing two or more groups of multicast participants to join a common multicast.

BACKGROUND OF THE INVENTION

Multicasting, as used herein, refers to the transmission of the same information in packets by a source to a multiplicity of receivers in a packet switched communications network.

There are two major steps in multicasting: multicast routing for establishing a desirable connection, and data forwarding for switching of packets at each intermediate switching node along the path. Multicast routing establishes a delivery route through which information packets can be exchanged efficiently among participants. The plurality of participants that exchange common data is referred to as groups.

Known internet protocols allow the establishment of multicasts on Internet Protocol ("IP") compliant networks. A commonly supported IP protocol, referred to as the Internet Group Management Protocol ("IGMP") is detailed in the Internet Engineering Task Force, Request for Comments, ("RFCs") 1112, 1122, 1812, 2236, 2715, 2933, and 3228.

Often, two or more established groups may wish to merge and later disband, to exchange data of common interest, increasing the flexibility in sharing data and supporting collaboration. The current IP multicast implementations, however, do not provide for graceful merging and disbanding of multiple groups. That is, they allow a host to join and leave a multicast group, but do not support a group to join another group as a unit. Thus to have the effect of a group of hosts (group X) joining another group of hosts (group Y), all members of group X individually join the group Y. The cost, in terms of network traffic, of having individual members joining and leaving increases rapidly with the number of members present in a group. As such, this approach is undesirable in most practical networks in which memberships may change frequently.

In addition, a host typically maintains open one port to listen to each group it wants to join. This form of implementation limits the total number of ports, and hence groups, a host can join. If there is a constraint on the number of ports a host can listen to, a host may have to leave some multicast groups to reuse these ports. This may cause the property of the original group setup to be lost.

As an alternative, a list defining the merge status of each group could be maintained at the application level. This however requires higher protocol processing as each packet needs to traverse up the IP stack, the transport stack and then onto the application layer before a decision can be made for sending the packet to a group. Hence, high transmission and protocol overhead will be incurred if the merge status of groups is maintained at the application level.

The constraints and limitations of existing IP multicast methods above have hampered the development of innovative group communication services for collaborative applications. Clearly, there is a need to provide a simple and yet powerful multicast architecture to support group operations in a packet switched network.

SUMMARY OF THE INVENTION

In accordance with the present invention, multicast groups may be merged at edge routers. Merging and disbanding of multicast groups may be controlled by a designated computing device (referred to as a connection manager) on each sub-network. Connection managers across sub-networks may communicate with each other to ensure merge and disband messages are properly distributed. Connection managers may optionally be interconnected hierarchically.

Connection managers may optionally act as proxies for merged groups to ensure traffic for merged groups is directed to a sub-network.

In accordance with an aspect of the present invention, there is provided a method of merging first and second multicast groups in a packet switched computer network. The network includes a plurality of sub-networks. The method includes receiving a request to merge the first and second multicast groups at a computing device, operable to receive requests to merge multicast groups from multiple hosts on the network; dispatching a request from the computing device to merge the first and second multicast groups to an edge router connecting one sub-network to other sub-networks, thereby signalling the edge router to duplicate data in packets for the first group to members of the second group in the sub-network.

In accordance with an aspect of the present invention, there is provided a method of operating an edge router connecting a sub-network to a packet switched network, comprising: maintaining a list of merged multicast groups at the router; duplicating data in packets destined for members of one of the groups on the sub-network, to provide the contents to members of a merged group on the sub-network, based on the list.

Aspects of the invention may be embodied on computer readable media; within computing devices; or as routers.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 12 illustrates alternate message formats of messages that could be exchanged between connection managers and routers in the network of FIG. 3;

FIGS. 27A to 27F illustrate alternate example messages that could exchanged between connection managers and routers in the network of FIG. 3, in place of the messages illustrated in FIGS. 11A-11F; and FIG. 28 illustrates further alternate message formats of messages that could be exchanged between connection managers and routers in the network of FIG. 3.

DETAILED DESCRIPTION

Figure 1:
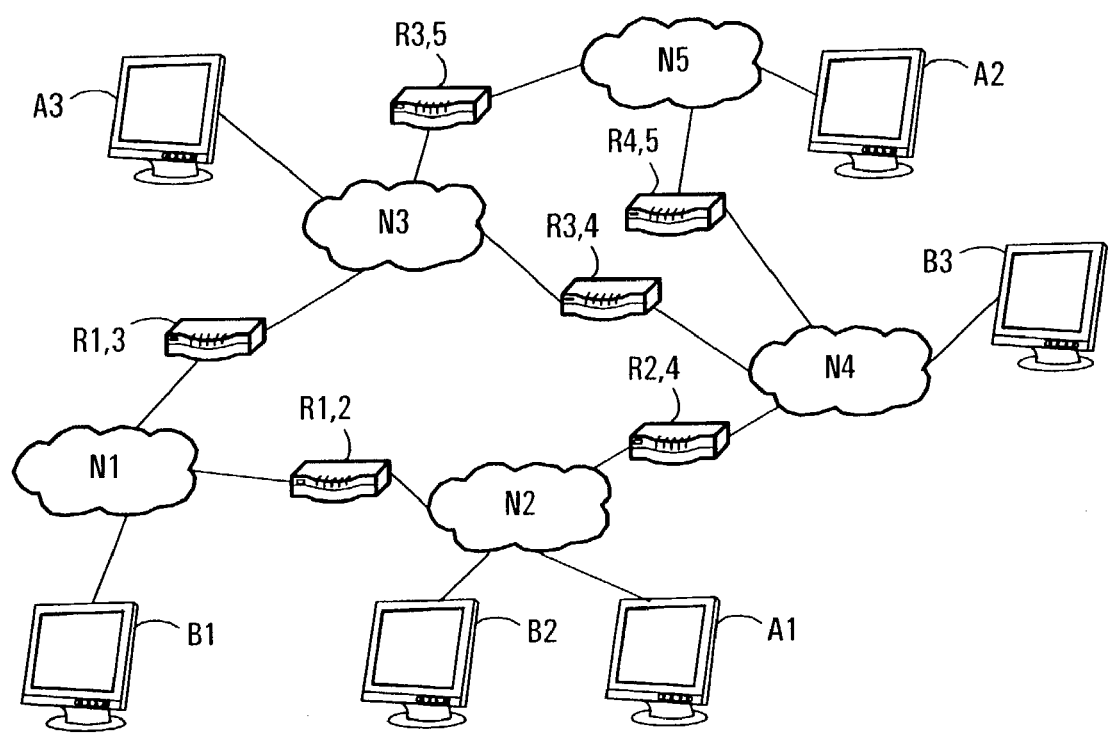
FIG. 1 illustrates a conventional packet switched computer network, allowing multicasts.

FIG. 1 illustrates a collection of internet compliant sub-networks N1, N2, N3, N4, and N5. Conventional routers R connect sub-networks. ($R_{ij}$ denotes a router that is connected to sub-network i and sub-network j). Individual computing devices have joined multicasts A and B. As illustrated, example multicast A has members: a1 in sub-network N2, a2 in sub-network N5 and a3 in sub-network N3. Multicast B has members: b1 in sub-network N1, b2 in sub-network N2 and b3 in sub-network N4.

Computing devices that are members of A and B and routers R, by virtue of software executing at the devices and routers, all adhere to the IGMP, as for example detailed in one or more of the Internet Engineering Task Force RFCs 1112, 1122, 1812, 2236, 2715, 2933, and 3228.

Figure 2:
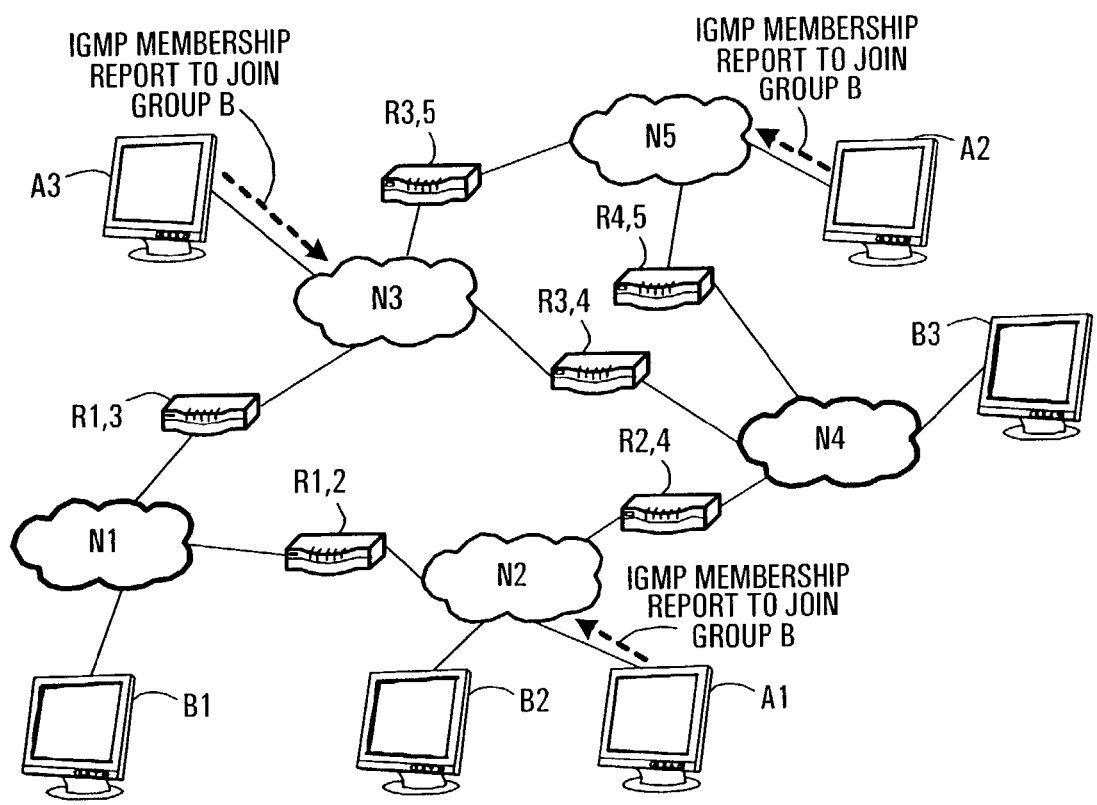
FIG. 2 illustrates merging of multicasts in the computer network of FIG. 1.

If multicast A (and its members) wishes to merge with multicast B (and its members) using the service provided by current IP multicast, each member of A would send individual conventional IGMP Membership Reports to join group B. This is illustrated in FIG. 2. The number of conventional IGMP Membership Reports sent increases with the number of members, so do the forwarding states of the routers involved. In addition, there is no mechanism in the existing IP multicast to ensure that all members of a particular group have joined another group. Thus, the desired merge of one group with another may not be reliable under such circumstances. Clearly the approach is neither efficient nor desirable.

From the foregoing description, persons of ordinary skill will readily recognize that use of conventional IGMP Membership Reports as described, results in increased traffic on the sub-networks resulting from each member of a particular group sending an IGMP Membership Report to join to another group. Further, there is no assurance that a desired merge of a sub group to another group will be completed in all sub-networks. As well, in a dynamic situation where groups are merged and disbanded frequently, inconsistency in group merge status is likely to occur as it is hard to ensure a merge or disband operation is fully completed.

Exemplary of the present invention, merging of multicast groups may be simplified by designating one computing device as a multicast connection manager; enabling computing devices (i.e. hosts) wishing to initiate a merge between two groups to initiate merging through the connection manager; and modifying routers to route traffic to merged groups on sub-networks. This may be appreciated, in overview, with reference to FIG. 3. As will become apparent, connection managers may take the form of existing routers or designated computing devices on a sub-network.

Figure 3:
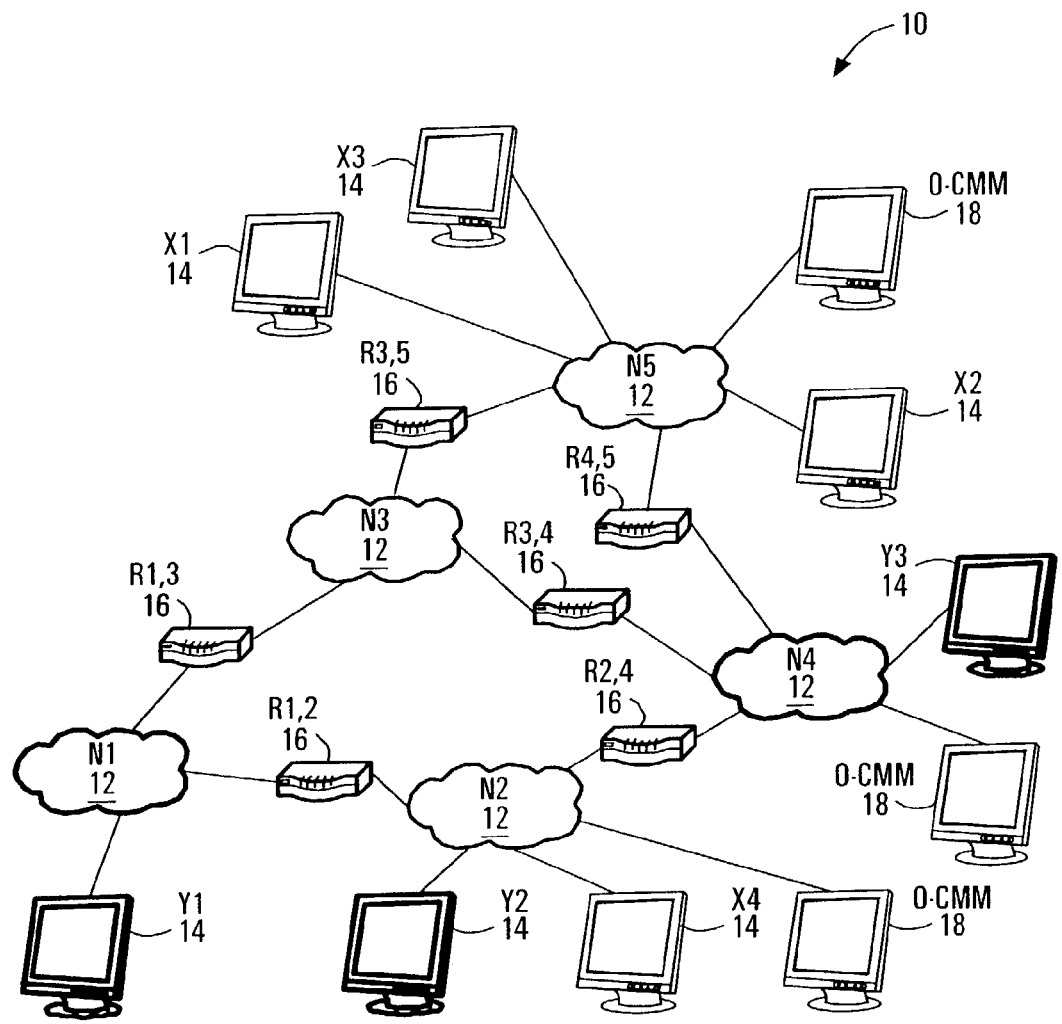
FIG. 3 illustrates a packet switched network, including computing devices and routers exemplary of embodiments of the present invention.

FIG. 3 therefore illustrates a network 10 formed of a collection of internet compliant sub-networks 12. Routers 16 interconnect sub-networks 12. Routers 16 are referred to as edge-routers as they are at the edge of the various sub-networks 12. Routers 16 include a processor coupled with computer readable memory storing software exemplary of embodiments of the present invention. Sub-networks 12 are preferably IP sub-networks, and are thus identifiable by a sub-network mask.

As illustrated, each sub-network 12 includes a plurality of conventional computing devices 14 (often referred to as hosts), capable of establishing multicast sessions, for example using a conventional IGMP protocol detailed in one or more of RFCs 1112, 1122, 1812, 2236, 2715, 2933, and 3228. Routers 16 are operable to route traffic in a conventional manner and to merge multicast groups, and broadcast to merged groups as detailed herein.

In the illustrated embodiment, each host 14 is a conventional network capable workstation. A host 14 could, for example, be an Intel x86 based computer acting as a Microsoft Windows NT, Windows 2000, Apple, or Unix based workstation, personal computer or the like. A host 14 typically includes a processor, in communication with computer readable memory; network interface; and may include input output interface; and video adapter. As well, a host 14 may optionally include a display and input/output devices, such as a keyboard, disk drive and a mouse (not shown) or the like. Its processor is typically a conventional central processing unit, and may for example be a microprocessor in the INTEL x86 family or any other suitable processor known to those skilled in the art. Its computer storage memory includes a suitable combination of random access memory, read-only-memory, and disk storage memory used by host 14 to store and execute software programs adapting the host to function in manners exemplary of the present invention. Further host 14 typically hosts and executes application software useable by an end-user. Computer readable medium may be a CD-ROM, diskette, tape, ROM-Cartridge or the like. Network interface is any interface suitable to physically link device to network. The interface may, for example, be an Ethernet, ATM, ISDN interface or modem that may be used to pass data, directly or indirectly, from and to network 10.

As well, each sub-network may include a connection manager 18 (hereinafter a 0-CMM 18), operable to merge established multicast sessions that were previously established in a conventional manner, and track merged sessions. The architecture of 0-CMM 18 is substantially the same as that of hosts 14 and includes software or firmware adapting it to receive and dispatch multicast merge and disband messages, in manners exemplary of the present invention and to maintain merge information in manners exemplary of the invention. 0-CMM 18 may for example, be a commercially available server including a processor, suitable computer readable memory, and a network interface. 0-CMM 18 may alternatively be formed using a programmable router.

In the embodiment of FIG. 3, 0-CMMs 18 of various sub-networks are in communication with each other by way of the sub-networks 12 and routers 16 they are connected with. The multiple CMMs thus define a connection management system (CMS), which is effectively a logical overlayed network. As will become apparent, intercommunication of 0-CMMs 18 by way of a CMS ensures that a merging or disbanding of multicast groups initiated within one sub-network 12 is propagated to other related sub-networks 12. There are at least three contemplated approaches to providing such a CMS, detailed below.

In any event, a 0-CMM 18 is provided for a plurality of hosts on network 10. Preferably, a 0-CMM 18 is provided for each sub-network that supports group merging in manners exemplary of embodiment of the present invention. However, as illustrated a sub-network including a 0-CMM 18 may communicate with sub-networks that do not have such 0-CMMs (e.g. illustrated N1 and N3). Each 0-CMM 18 at a sub-network is referred to herein as a $0^{th}$ level CMM (0-CMM). Each 0-CMM 18 is assigned to manage merge and disband requests for its sub-network and is thus authoritative over its sub-network. Software at each 0-CMM 18 causes the 0-CMM 18 to respond to MERGE and DISBAND messages (described below) received from hosts 14 in its sub-network 12. Additionally, each 0-CMM 18 responds to MERGE and DISBAND requests received from other 0-CMMs 18 on the CMS. The 0-CMM 18, in response, sends corresponding IGMP_Merge_Request or IGMP_Disband_Request messages (also described below) to edge routers in its sub-network.

Figure 4:
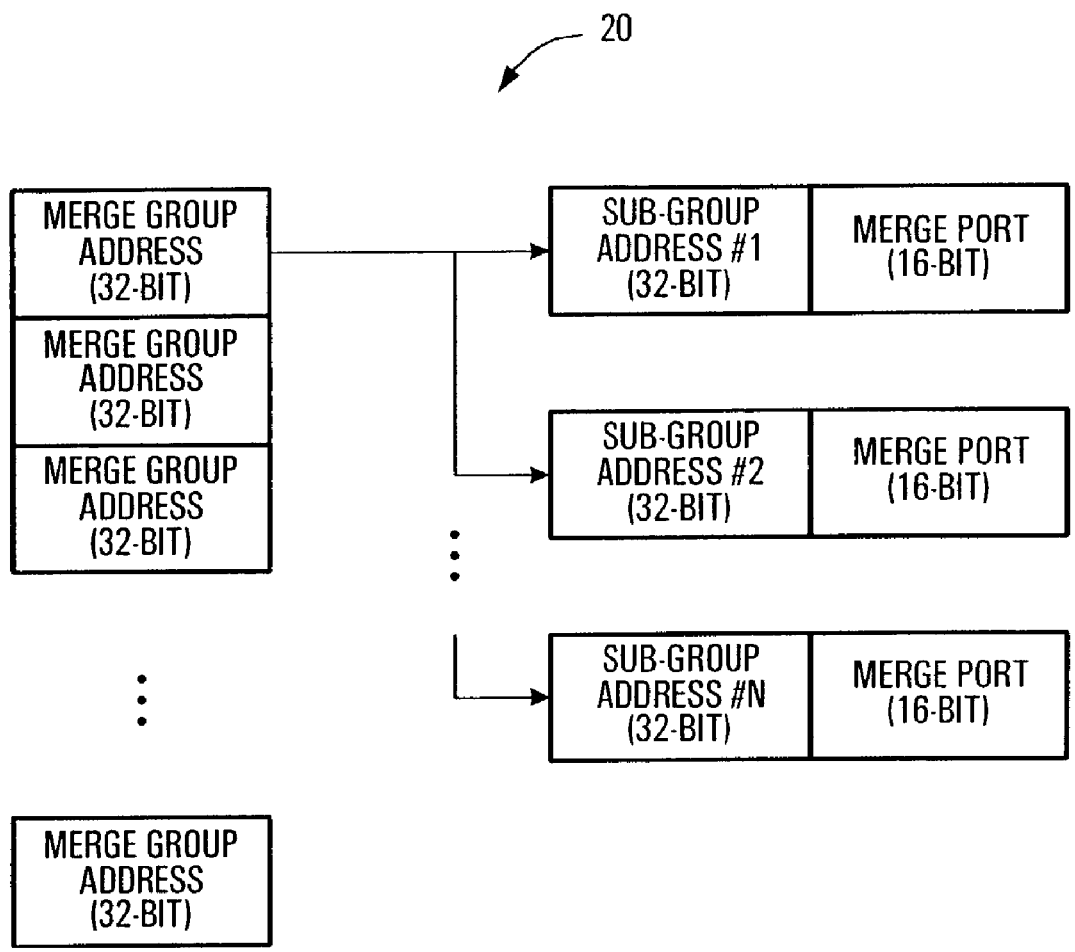
FIG. 4 illustrates an exemplary data structure, maintaining an indicator of merged groups stored at a computing device of FIG. 3.

Each 0-CMM 18 preferably maintains a data structure to keep track of the merged multicast groups in its sub-network. An exemplary data structure 20 called cmm_merge_table is depicted in FIG. 4. As illustrated, each row of the table shows the relationship of a group to other sub-groups with which it has merged.

Figure 5:
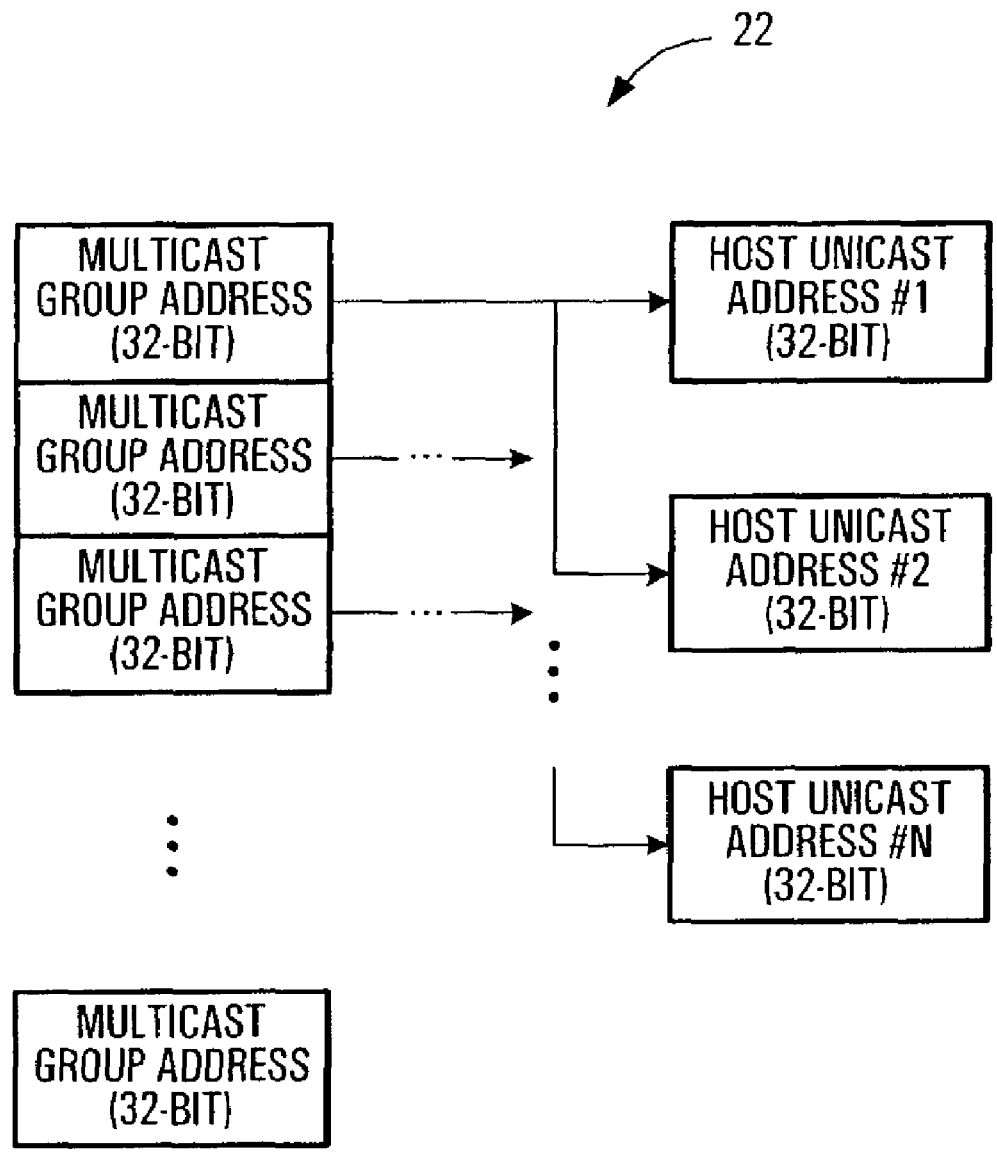
FIG. 5 illustrates an exemplary data structure, maintaining an indicator of group memberships of hosts, stored at a computing device of FIG. 3.

In addition, each 0-CMM 18 preferably keeps track of multicast group memberships in another data structure. An exemplary data structure 22 in the form of a table, called a cmm_group_table is depicted in FIG. 5. This table keeps track of multicast memberships of individual local hosts by monitoring the normal IGMP membership report messages exchanged by hosts 14.

Figure 6:
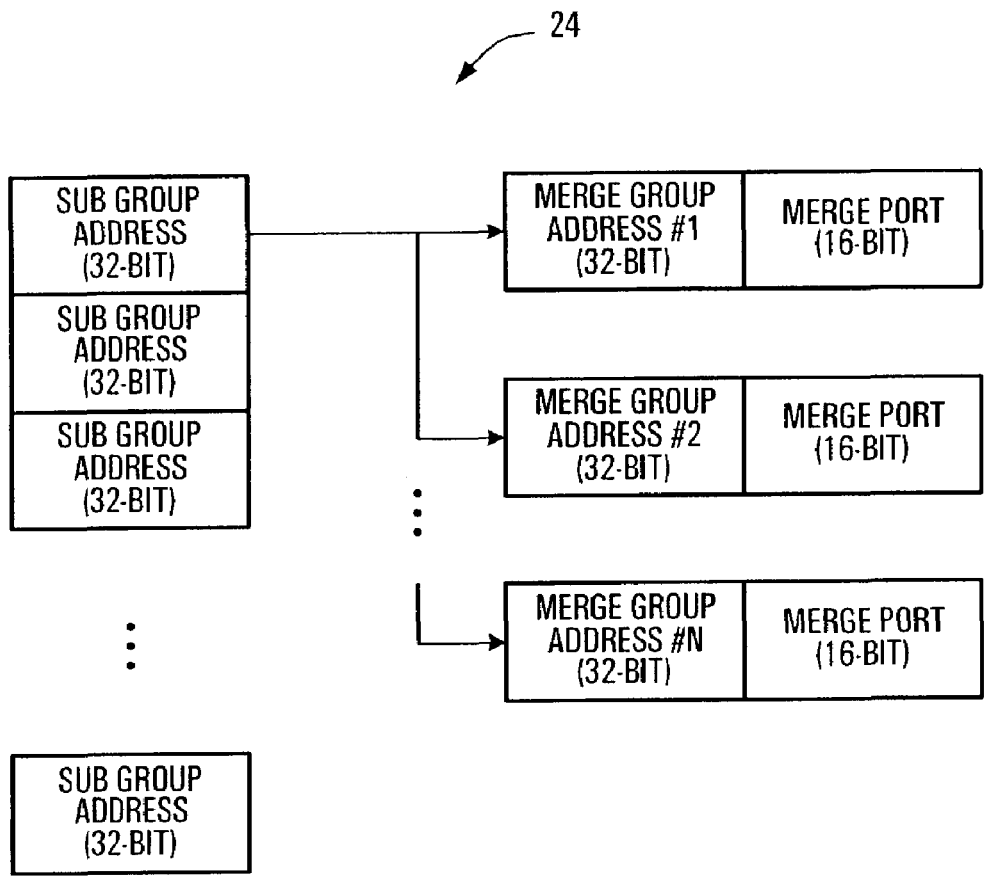
FIG. 6 illustrates an exemplary data structure, maintaining an indicator of merged requests, stored at a computing device of FIG. 3.

Further, each 0-CMM 18 maintains a third data structure to keep track of the list of MERGE messages received from other CMMs and from hosts of the local sub-network. An example data structure 24 keeping track of such MERGE messages, in the form of table (called a merge_table) is illustrated in FIG. 6. As illustrated, table 24 merge_table maintains entries identifying the relationship between a sub-groups and other groups.

Additionally, software at each 0-CMM 18 causes execution of a process (referred to as a 0-CMM daemon which is typically residing in 0-CMM) that listens to all IGMP messages in the sub-network of a 0-CMM 18. Whenever the 0-CMM 18 daemon receives an IGMP Membership Report, it will relay this message to the 0-CMM 18. 0-CMM 18 uses this information to update its cmm_group_table (data structure 22—FIG. 5) to maintain an awareness of group memberships of hosts 14 in its sub-network.

Conveniently, the network drivers of hosts 14 need not be modified to support proposed IGMP extension. Also, each 0-CMM 18 can impose policies on determining which host on its sub-network has the right to request a MERGE or a DISBAND operation. In this way, a 0-CMM 18 only needs to respond to messages from authorized computing devices, authorized to originate merge or disband messages. Authorization may be effected in a conventional manner, using for example, conventional authentication certificates.

Multicast routers 16 multicast received data to members of merged groups. In order to do this, routers 16 are informed of merged groups and their disbanding by 0-CMMs 18 (by IGMP_Merge_Request and IGMP_Disband_Request messages), as detailed below. Additionally, routers 16 maintain a data structure indicative of group mergers.

Figure 7:
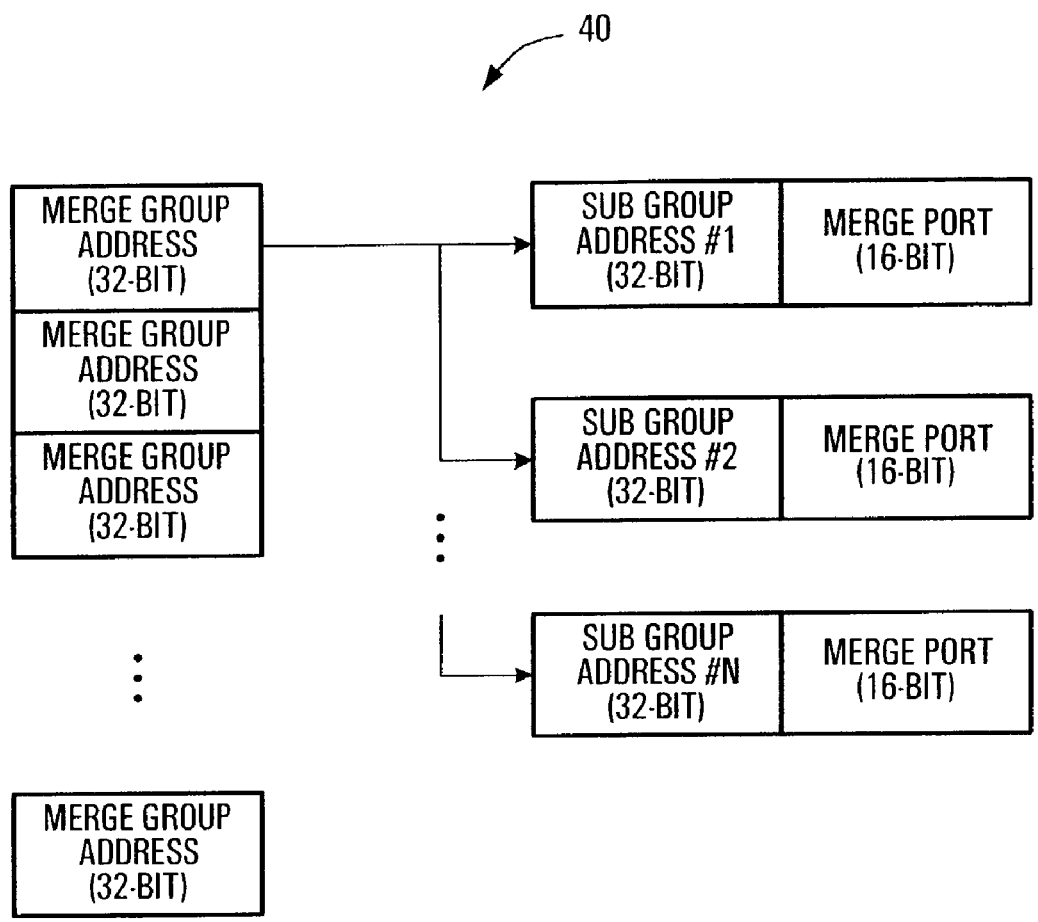
FIG. 7 illustrates an exemplary data structure, maintaining an indicator of merged groups stored at a router of FIG. 3.

An exemplary data structure may be in the form of a table (referred to as router_merge_table). An example table 40 that may be maintained at router 16 is illustrated in FIG. 7. In the illustrated table, the "Merge Group Address" denotes a multicast group recognized by the multicast router maintaining table 40. A "sub-group address" denotes the group that has successfully joined as a group member of the "Merge Group"; the "Merge Port" denotes the corresponding port used for this merge. Exemplified router_merge_table 40 of FIG. 7 has only two levels. In other words, if a sub-group X containing child sub-groups (i.e. $x_1, x_2, . \subset X$) merges with group Y, the address of each children sub-group ($x_1, x_2 \ldots$) will be entered as a separate sub-group address entry in FIG. 7. As will be apparent, other data structures for various merge tables are also possible, having a unique relationship between the merge group and its subgroup.

Preferably, entries of router_merge_table 40 are maintained in a soft-state. That is, they are deleted automatically if they are not updated within a time-out period. This simplifies the maintenance of the router_merge_table 40, as stale merge state information are automatically removed and hence leads to better utilization of the memory storage of router. Inactive groups and unexpected partial failure or misbehaving of routers are examples of possible causes for making the merge state information stale.

The router_merge_table 40 is used to duplicate data destined for a multicast group that has merged with another. Data within packets intended for a group that has been merged with another are replicated and dispatched to members of either groups serviced by the router, as described below.

Merge_tables 24 at 0-CMMs 18 are updated in response to requests received from associated 0-CMMs 18. Thus, 0-CMMs 18 have the ability, and responsibility, to cause reconfiguration of routers 16 in order to merge multicast groups, and to disband merged groups.

In operation, at least some hosts 14 have joined multicasts in a conventional manner. For example, hosts 14 may join multicasts using the IGMP. A designated host 14 may initiates multicast group merging and disbanding by dispatching suitable MERGE and DISBAND messages. The host 14 initiating the multicast group merging or disbanding may, but need not be, a member of an existing multicast group. As noted, the MERGE and DISBAND messages are preferably authenticated to ensure only authorized computing devices initiate group merging or disbanding. In any event, the designated host 14 dispatches such messages to the 0-CMM 18 for its sub-network. This 0-CMM 18 exchanges MERGE and DISBAND messages with other CMMs. It also exchanges suitable messages with routers 16 connected to its sub-network in order to configure routers 16 to merge and disband multicast groups in manners exemplary of embodiments of the present invention. In the preferred embodiments, messages to merge and disband multicast groups exchanged between 0-CMMs 18 and routers 16 are formed as extension to IGMP messages.

An example MERGE message may take the form "1#subGroupIP#mergeGroupIP#mergeport#", where "1" indicates this is a local MERGE request. An example DISBAND message may take the form "4#subGroupIP#mergeGroupIP#mergeport#", where "4" indicates this is a local DISBAND request.

Figure 8:
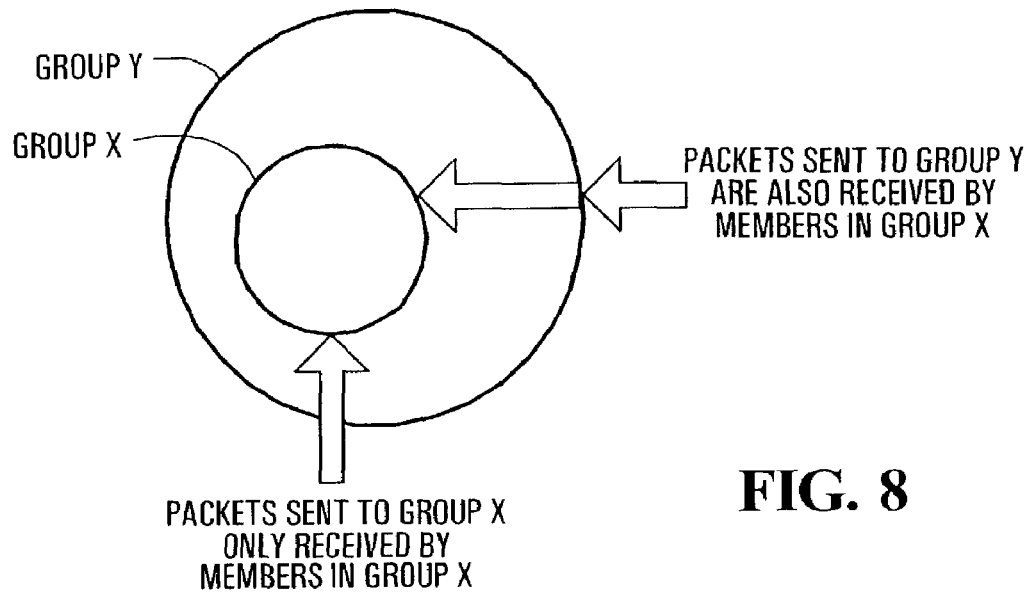
FIG. 8 schematically depicts asymmetric merging of groups.
Figure 9:
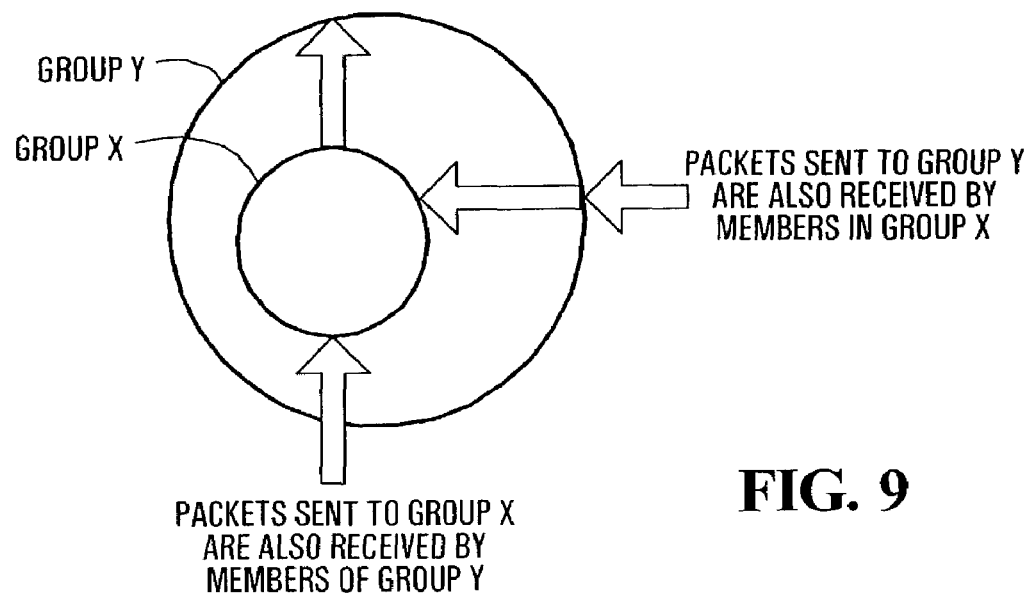
FIG. 9 schematically depicts symmetric merging of groups.

Two kinds of merge operations are possible: asymmetrical merge and symmetrical merge. Similarly, two types of disband operations are possible. When a group X has merged asymmetrically to another group Y (i.e. X→Y), IP multicast packets sent to group Y are also be received by group X. However, IP multicast packets sent to group X are received only by members of group X (this is schematically illustrated in FIG. 8). In this case group X is said a 'child' of group Y. Using the same example, packets sent to X or Y will be received by all members when X has merged to Y symmetrically (i.e. X⇔Y) (FIG. 9). A symmetrical merge can be accomplished in two asymmetrical merge operations, such as X→Y and Y→X.

Similar, an asymmetrical disband (X from Y) is denoted as X←Y and a symmetrical disband (X from Y) is denoted as X-Y.

Other more complex membership operations are possible. For example, cascading merge such as [(X→Y)→Z]→S, cascading disband such as [(X←Y)←Z]←S, and exclusion of a merged group from a membership, such as [(X→Y)→Z, X←Z] that enable X to receive from Y but not from Z and at the same time Y can receive from Z, are all possible.

Thus, complex multi-level group structures can be created. These group connection operations present powerful and convenient mechanism for manipulating relationship between users and groups for better sharing of information, retaining group identity and if desirable, retaining privacy (as in asymmetrical merge). In addition, these merging and disbanding operations have minimal impact on existing multicast trees and are independent of the protocol used for building multicast trees.

For example, by viewing an already merged group as a single group, an IGMP_Merge_Request message (detailed below) may be sent to another group (e.g. group Z) to register an interest to merge to another group (e.g., (X→Y)→Z). This merge (from the point of view of group Z) is seen as a single group merge request to group Z. If the merge request is successful, a complex group structure is created where group Z has group Y merged to it, and group Y in turn has group X merged to it. By extrapolating this, complex group structures could be created recursively.

Exemplary of embodiments of the present invention, six new IGMP message types are defined. Each of these types of messages may be exchanged between a CMM and a multicast router 16. Example message types are referred to herein as the IGMP_Merge_Request; the IGMP_Merge_Posv_Reply; the IGMP_Merge_Negv_Reply; the IGMP_Disband_Request; the IGMP_Disband_Posv_Reply; and the IGMP_Disband_Negv_Reply messages.

The extended IGMP messages can be coded in any number of ways. For example they may be defined by defining a new message type and new code field for each of the extended IGMP messages, as shown in FIGS. 11A to 11F. Alternatively, messages could be defined using the unassigned 'code field' of IGMPv1 membership report message to represent the new extended messages.

Figure 10:
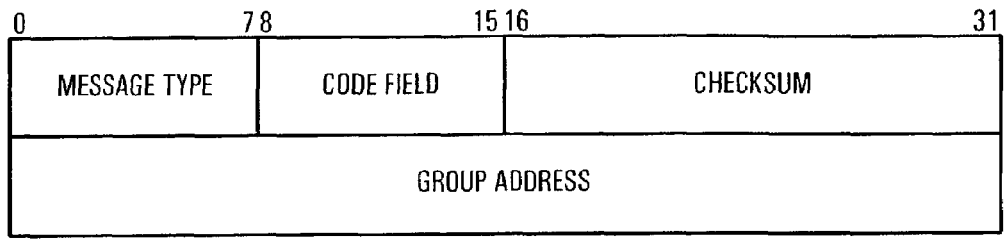
FIG. 10 illustrated the general IGMP version 2 (IGMPv2) packet format.

In the described embodiment, example extended IGMP message formats may be defined according to the general IGMP packet format (FIG. 10) for group merge and disband functions. FIG. 10 illustrated the general IGMP version 2 (IGMPv2) packet format. The IGMPv2 packet format is used as the basis for extension because it is the current standard for IGMP. (IGMPv3 is still under draft status, and possible messages are further described below.) As illustrated in FIG. 10, the 8-bit "message type" field indicates the message type of a particular IGMP protocol. The next 8-bit "code field" indicates the code type that is used corresponding to a particular message type. The next 16-bit is a checksum for the 8-byte IGMP message. The 32-bit "group address" field contains the multicast address of the group concerned. In the existing IGMP protocols not all message types are defined. Under the existing IGMP protocol unidentified IGMP message types will be ignored. Hence, the suggested extensions to the existing IGMP protocol will be ignored by the conventional multicast routers but will be processed by multicast routers 16, exemplary of embodiments of the present invention.

Figure 11A:
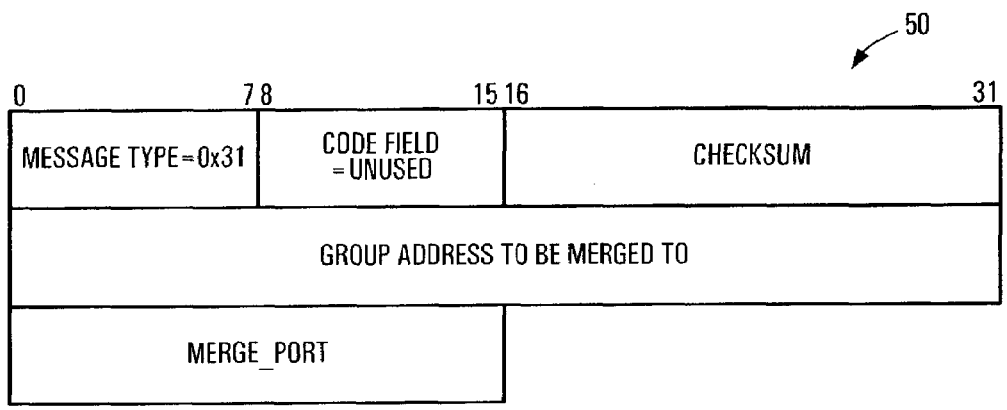
FIGS. 11A to 11F illustrate example messages exchanged between connection managers and routers in the network of FIG. 3.

A proposed IGMP_Merge_Request message 50 format is shown in FIG. 11A. IGMP_Merge_Request message 50 is used to request merges and is dispatched by host 14. The IGMP_Merge_Request message 50 has a message type of 0x31. It does not make use of the code field. The function of checksum remains the same as for all standard IGMP messages. The 32-bit group address is the class D address (as defined in RFC 1112) to be merged to. The next 16-bits contain the merge port field. The merge_port allows a receiver in group X to differentiate multicast packets sent directly to multicast group X from packets that are sent to multicast group Y (assuming X→Y).

The IGMP_Merge_Request message 50 is a response of a 0-CMM 18 to the MERGE message, and is intended partly as a reminder to all members of group X within a sub-network about the merge operation of group X to group Y. This message is encapsulate in an IP packet, with the multicast address of X as the destination IP address The IP packet will be received by the modified multicast edge router 16, and processed as a merge request for group X (indicated by the destination IP address of this IP datagram) to merge with group Y as (indicated by 'the group address to be merged to' of the encapsulated IGMP_Merge_Request message).

Figure 11B:
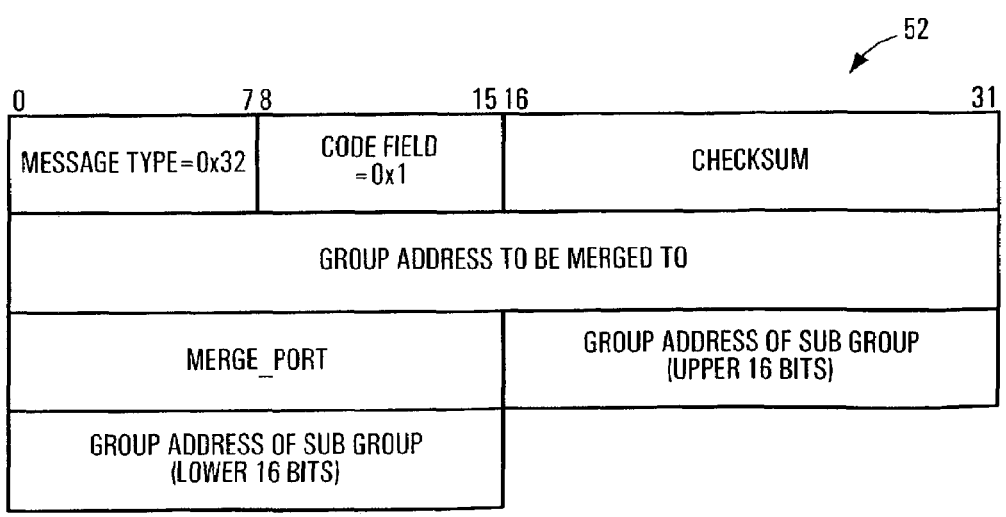

An exemplary format of a IGMP_Merge_Posv_Reply message 52 is shown in FIG. 11B. An IGMP_Merge_Posv_Reply message 52 is used by a multicast router 16 to provide a positive merge. That is, a modified multicast router 16 sends this message as a response to the requester indicating the successful operation of a previously received IGMP_Merge_Request message 50 (FIG. 11A). It is defined by the combination of two fields in the IGMP packet. The message type of 0x32 indicates this is an IGMP_Merge_Posv_Reply message type, and the code field of 0x1 indicates this is a positive reply.

An additional 32-bit multicast address field is preferably attached behind the merge_port field (FIG. 11B). This field stores the multicast address of the sub-group (i.e. group X, for X→Y) that has issued the merge request. This serves as a checking mechanism because a 0-CMM 18 may send out several IGMP_Merge_Request messages 50 at the same time. This sub-group multicast address indicates a successful sub-group merge operation.

Figure 11C:
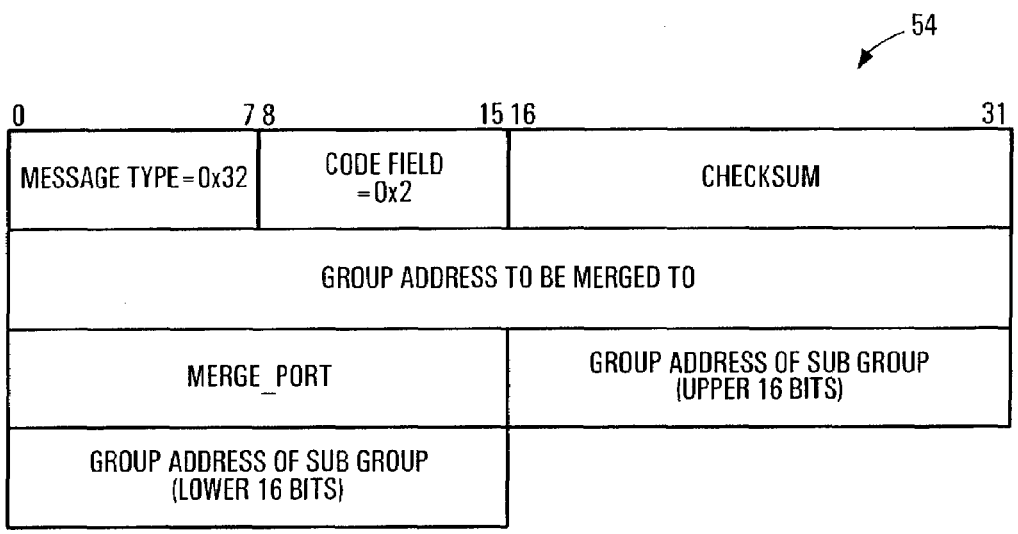

The format of a IGMP_Merge_Negv_Reply message 54 is shown in FIG. 11C. A modified multicast router 16 sends this message type as a response to signal a failure in processing a IGMP_Merge_Request message 50. This message is identified with type field value of 0x32 similar to that shown in FIG.

11B, except that the code field has a value of 0x2 to indicate a failure in the merge operation.

Figure 11D:
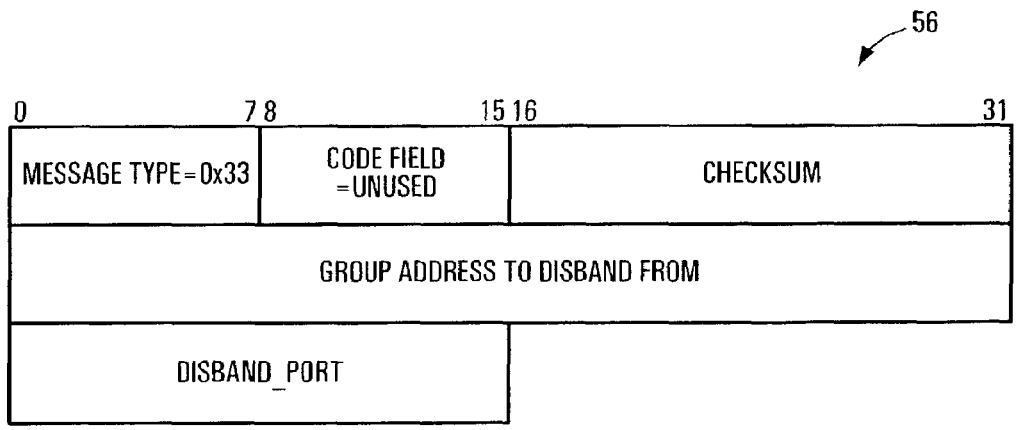

An example format of an IGMP_Disband_Request message 56 is shown in FIG. 11D. It has a message type of 0x33 and does not make use of the code field. The function of checksum remains the same as for standard IGMP messages. The 32-bit group address is the class D address to disband from. The next 16-bit contains the disband_port field.

The IGMP_Disband_Request message 56 is a response of a 0-CMM 18 to a DISBAND request from a representative member of group X to leave group Y. This request is encapsulated in an IP packet to inform all members of group X about the disbanding from group Y. Thus, the multicast address of X is stored in the destination address field of the IP packet header. The IGMP_Disband_Request message 56 will also be received and acted upon by the modified multicast router 16.

The disband_port field allows the modified multicast router to check whether this disband request is valid. If the specified disband_port field does not match one of the existing merge status managed by the multicast router, it is considered as an invalid disband request.

Figure 11E:
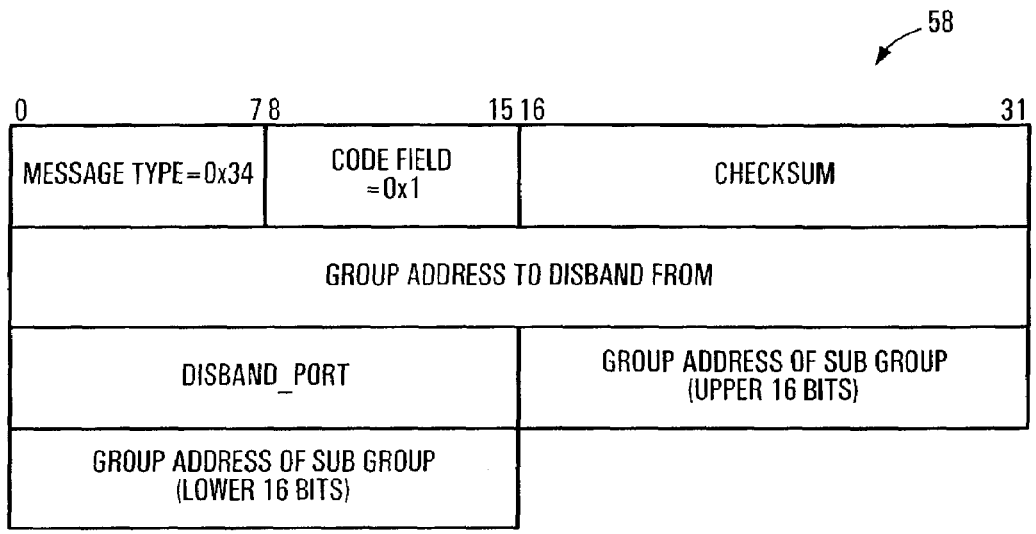

Routers 16 send IGMP_Disband_Posv_Reply messages 58 as a response to the successful previous disband request. The format of this message type is shown in FIG. 11E. It is defined by the combination of two fields in the IGMP packet. The message type of 0x34 indicates a reply message, and the code field of 0x1 indicates this is a positive reply. An additional 32-bit multicast address field is attached behind the disband_port field. This stores the multicast address of the sub group (e.g X) that has issued the disband request. This serves as a checking mechanism because a 0-CMM 18 may send out several IGMP_Disband_Request messages at the same time. This sub group multicast address identifies a successful disband operation for a sub group.

Figure 11F:
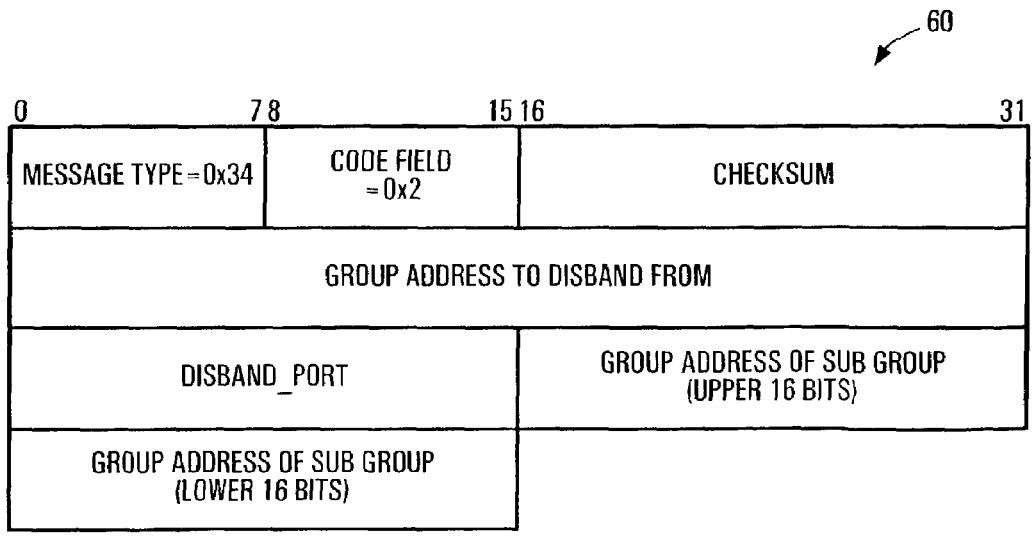

The modified multicast router sends a IGMP_Disband Negv_Reply message 60 to signal a failure in processing a IGMP_Disband_request message 56 (FIG. 11D). The message format is shown in FIG. 11F. This message type is similar to that shown in FIG. 11E, except that the code field is specified to be 0x2 to indicate a failure in the disband operation.

In IGMP v2, the existing IGMP message type 0x12 (for denoting IGMP Version 1 Membership Report) does not make use of the next 8-bit "code field". Thus, alternatively, the six new IGMP Merge and disband message could be completely specified by this un-assigned 8-bit "code field" of the message type of 0x12 with different code values. This is illustrated in FIG. 12.

Routers 16 that are connected to the same sub-network as a 0-CMM 18 will act upon an IGMP_Merge_Request message 50 received from a 0-CMM 18 for a merge of group X to group Y. The existing multicast routing protocols ensure only one multicast router is responsible for transmitting multicast packets for a particular group (e.g. X) in a sub-network. As such, only this router will merge messages as described herein. Remaining routers receiving the merge messages will simply ignore the message.

This particular router, upon receiving the IGMP_Merge_Request message 50, processes the request and then generates an appropriate reply message. If the request is successful, the merge status is also updated in the router.

Now, a host in a sub-network can dispatch conventional IGMP membership reports to join a multicast group and repeat such requests periodically to remain in the group as stipulated in standard IGMP. Additionally, some hosts may dispatch MERGE and DISBAND messages with a TTL (Time To Live) of 1 to 0-CMM 18 to have an identified multicast group join or leave another group. A TTL of 1 will limit MERGE and DISBAND messages to be sent within a sub-network; they will not be forwarded beyond the sub-network.

Figure 13:
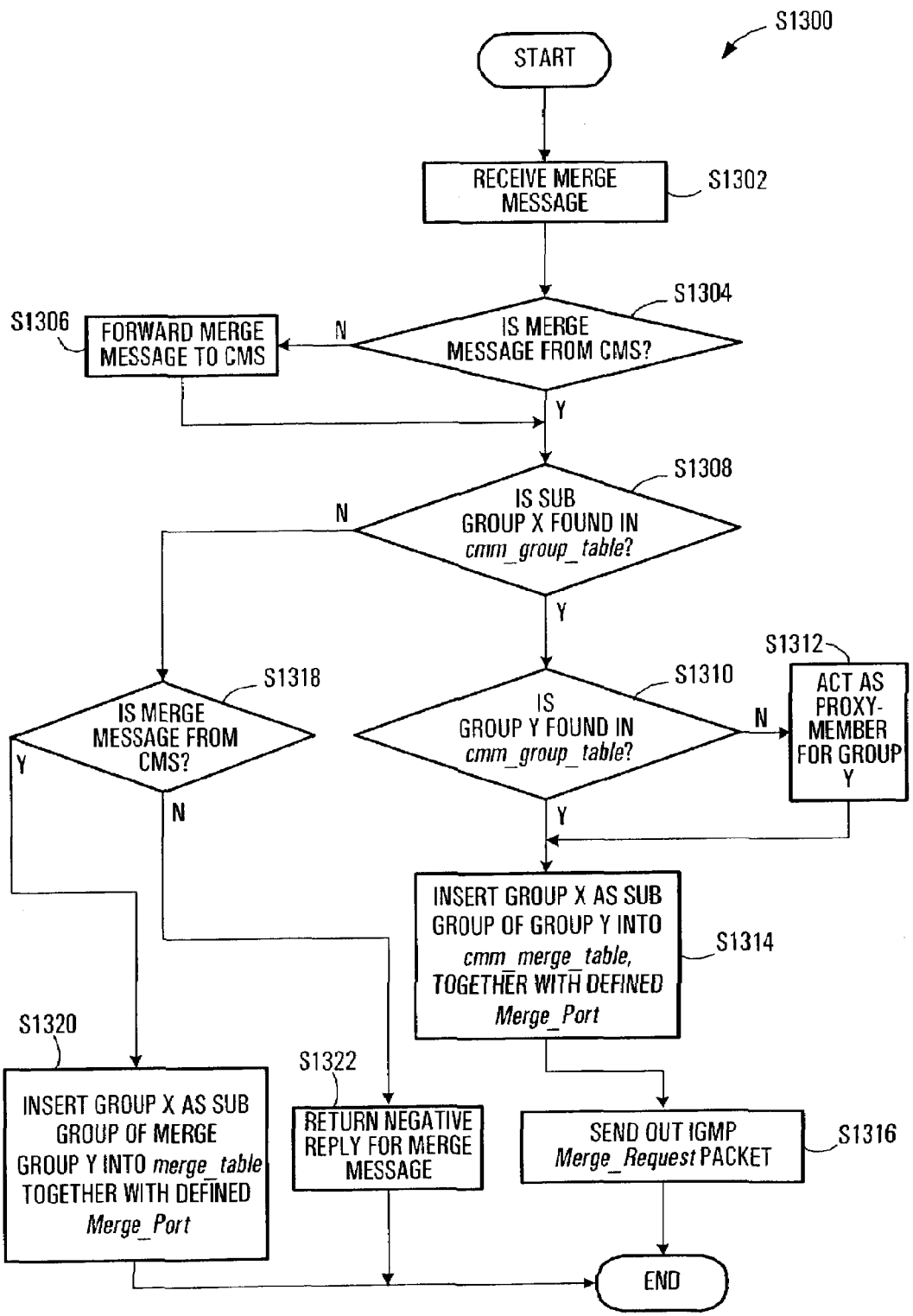
FIG. 13 is a flowchart illustrating steps performed at a connection manager of FIG. 3, to merge groups.

When a 0-CMM 18 receives a MERGE message, it performs steps S1300 illustrated in FIG. 13. As illustrated, upon receipt of a MERGE message in step S1302 0-CMM 18 initially determines if the MERGE message originates with a host 14, or from another 0-CMM 18 (i.e. the CMS) in step S1304. If the MERGE message originates from a host 14 (i.e. it does not originates from another CMM), it is forwarded to other 0-CMMs 18 on network 10 in step S1306, by way of the CMS. Next, the 0-CMM 18 determines if there are members of group X on the sub-network of the 0-CMM 18 in step S1308. If not, the 0-CMM 18 simply keeps track of the merge status in its merge_table data structure 24 (FIG. 6) for messages from another CMM (i.e. the CMS), as determined in step S1318, in step S1320, or returns an error message to the host originating the request (step S1322). If a member of group X is on the sub-network of the CMM 18, the CMM 18 inserts group X as a sub-group of group Y in its cmm_merge_table data structure 20 (FIG. 4) in step S1314. If no members of group Y are in the sub-network, 0-CMM 18 acts as a proxy for group Y, in step S1312 as detailed below. As well, an IGMP_Merge_Request message 50 is dispatched to any neighbouring routers 16 in step S1316.

Figure 14:
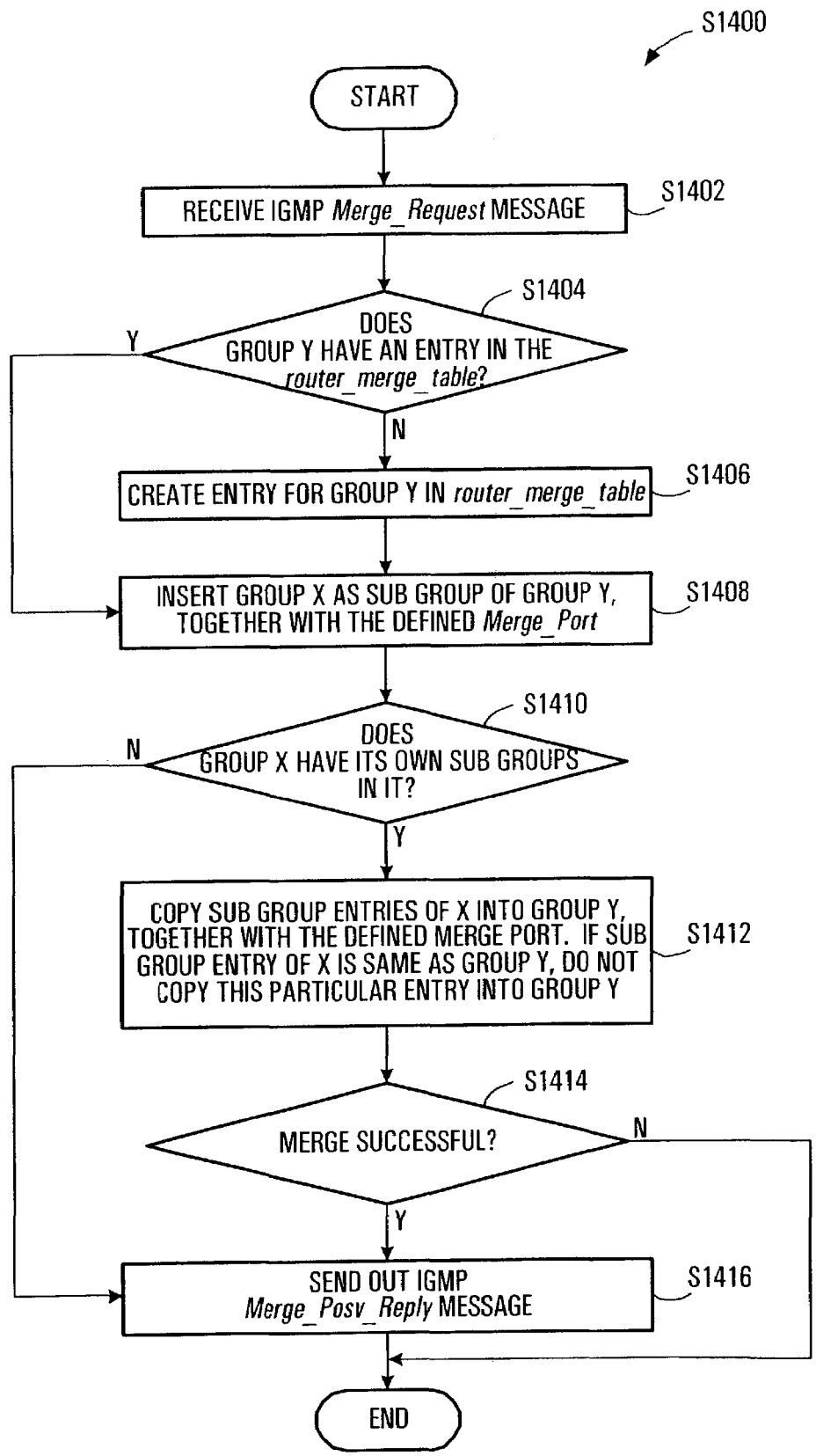
FIG. 14 is a flowchart illustrating exemplary steps performed at a router of FIG. 3, to merge groups.

Steps S1400 performed by a multicast router 16 upon receipt of IGMP_Merge_Request dispatched in step S1316 are illustrated in FIG. 14. As illustrated upon receipt of the IGMP_Merge_Request message for merge X→Y in step S1402, an exemplary router 16 checks whether group Y has an entry in its router_merge_table 40 (FIG. 7) in step S1404. If so, group X is inserted into the corresponding entry in step S1408. In addition, the merge_port from the packet is stored. If group Y does not have an entry in the router_merge_table 40, a new entry for group Y is created in step S1406.

If group X has sub-groups previously merged into it (i.e. X is a complex group) as determined in step S1410, the corresponding table entries for the sub groups (with their corresponding entries for merge_port) of X are copied over to group Y's entry in step S1412. This caters to complex group structures such as those resulting from cascading merging or disbanding of groups. When a group merges to another group as a sub-group (e.g., X→Y), if any of his child sub group address ($x_1, x_2, \ldots, x_i, \ldots$) is same as the multicast address of the merge group (Y) address entry, the child sub-group address ($x_i$) will not be copied to the router_merge_table 40 as a sub-group address of Y. This prevents creation of an entry for a group merging to its own group (i.e., A→A). Additionally, it prevents a group from receiving duplicated copies of a packet. An example is when a symmetrical merge occurs between two groups, says X→Y and then Y→X. In this case of X→Y, the merge group address of Y in the router_merge_table 40 (FIG. 7) will have only X as a sub group and subsequently for Y→X, the merge group address of X in the router_merge_table 40 will have only Y as a sub group despite X being a sub-group of Y as a result of the preceding X→Y.

If the merge operation is successful as determined in step S1414, an IGMP_Merge_Posv_Reply message 52 is sent to the originator of the IGMP_Merge_Request message 50 in step S1416. Otherwise, an IGMP_Merge_Negv_Reply message 54 is returned (not illustrated).

If the merger is successful, group X preferably becomes part of group Y while still retaining its original properties. This means that members of group X receive all messages sent to group Y, but group Y does not receive messages sent to group X. Group X maintains its own privacy though it has been merged with group Y. (see FIG. 8)

Figure 15:
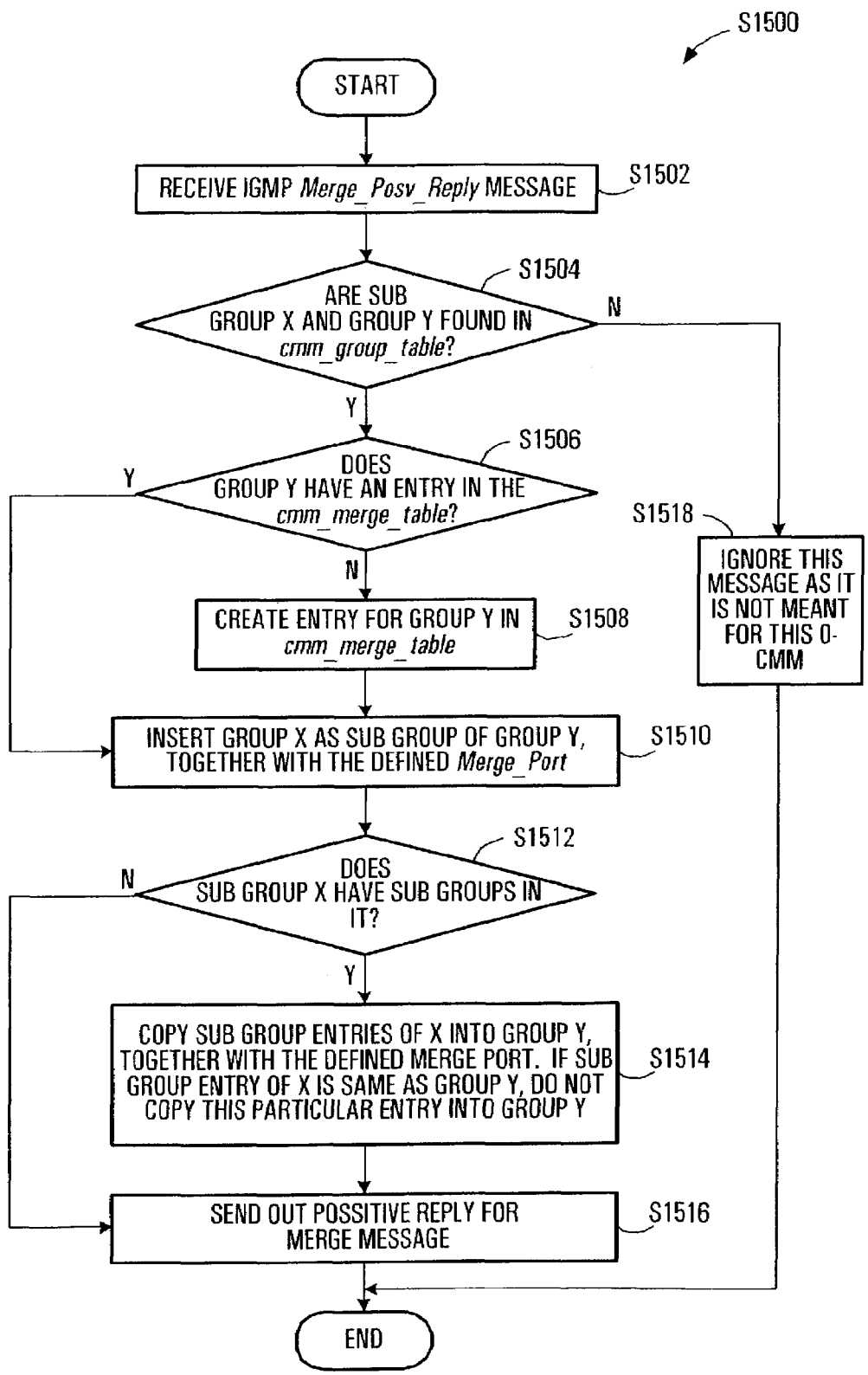
FIG. 15 is a flowchart illustrating steps performed at a connection manager of FIG. 3, to merge groups.

Steps S1500 performed by a 0-CMM 18 in response to receiving an incoming IGMP_Merge_Posv_Reply message 52 are illustrated in FIG. 15. As illustrated, an IGMP_Merge_Posv_Reply message is received in step S1502. If the groups X or Y are not found in the cmm_group table data structure 22 (FIG. 5) at 0-CMM 18, as determined in step S1504, the message is ignored in step S1518. If only group X is found in the cmm_merge_table data structure 20 (FIG. 4), as determined in step S1506 an entry for group Y is created in the cmm_merge_table data structure 20 in step S1508. Once group Y has an entry in the cmm_group table data structure, group X is inserted and its merge port is inserted as a sub group of group Y in step S1510. If group X has any sub-groups, as determine in step S1512, these are copied into group Y in step S1514. A positive reply is sent to the host 14 originating the MERGE message. Steps S1500 are performed to ensure 0-CMM 18 maintains the same knowledge of merge groups as the responsible router 16. The 0-CMM 18 returns a negative reply for the MERGE message if it receives an IGMP_Merge_Negv_Reply message 54 from the router 16.

A designated host sends MERGE messages periodically to the 0-CMM 18. This action refreshes the 'soft-state' merge status maintained in the cmm_merge_table data structure 20 (FIG. 4), as entries in this table are subjected to a "time out" upon which entries are considered stale and automatically deleted. To eliminate the designated host as a potential single point of failure, a few hosts can actually be designated for sending the same MERGE requests to provide robustness. This can be achieved without the need for any changes to the protocols for the case of a single designated host 14. Instead, an application may prepare and dispatch the relevant MERGE/DISBAND messages.

As noted, in order to have the merge and disband function across multiple sub-networks, MERGE and DISBAND messages are transmitted from a particular 0-CMM 18 receiving such messages from a host to other 0-CMMs 18 on the rest of the CMS in step S1306 (FIG. 13). Of course, not all MERGE and DISBAND messages need be transmitted to the rest of CMS. A 0-CMM 18 that receives these messages from the hosts may limit the merge or disband effect to be within the sub-network. This is achieved by not propagating these messages using the CMS.

Figure 16:
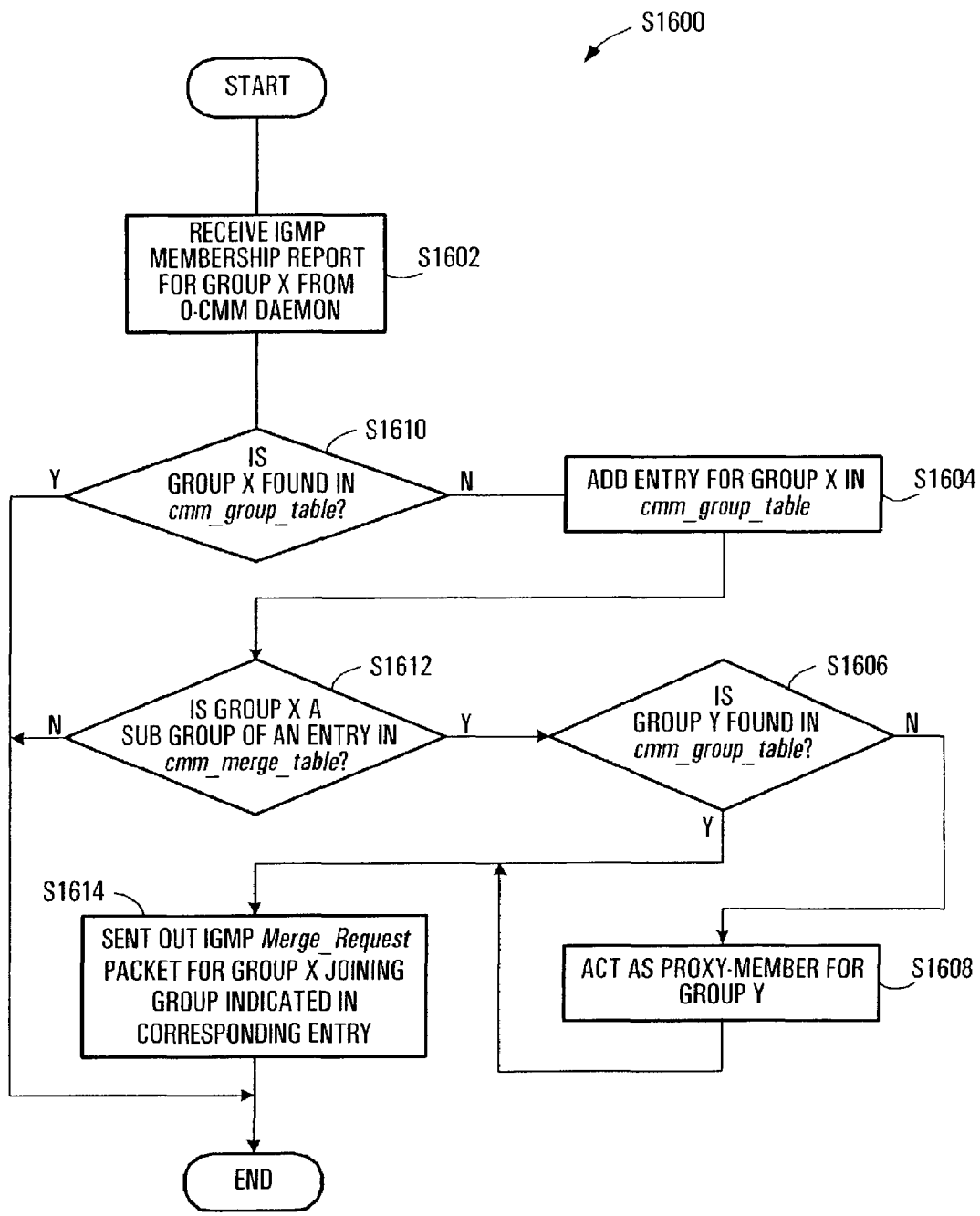
FIG. 16 is a flowchart illustrating steps performed at a connection manager of FIG. 3, to monitor multicast messages.

Once groups are merged, the 0-CMMs 18 preferably additionally monitor new members to a merged group. This is illustrated in FIG. 16. As noted, each 0-CMM 18 monitors IGMP messages originated by hosts in its sub-network. Thus, a 0-CMM 18 may monitor if a host joins group X in a sub-network where previously there are no members of X in it. Specifically, when the 0-CMM receives an IGMP Membership Report in step S1602 from any host for any group, it first checks whether that group is found in its cmm_group_table data structure 22 in step S1610. If it is not found, an entry for that group is added in the cmm_group_table 22 in step S1604. Next, the 0-CMM checks whether that group is merged to any group by referring to the cmm_merge_table data structure 20 in step S1612. If it is a sub group of another group (e.g. group Y), the 0-CMM will check whether there is a need to be a proxy member for group Y in step S1606. If so, the 0-CMM become a proxy for group Y by joining group Y in a conventional fashion in step S1608. Once it is confirmed that group Y is in this sub-network, the 0-CMM sends an IGMP_Merge_Request message 50 to the modified router 16 in step S1614. Such an arrangement makes the merge operation in this situation seamless and it does not require the first new member of group X in a sub-network to explicitly request for merge operation.

Figure 17:
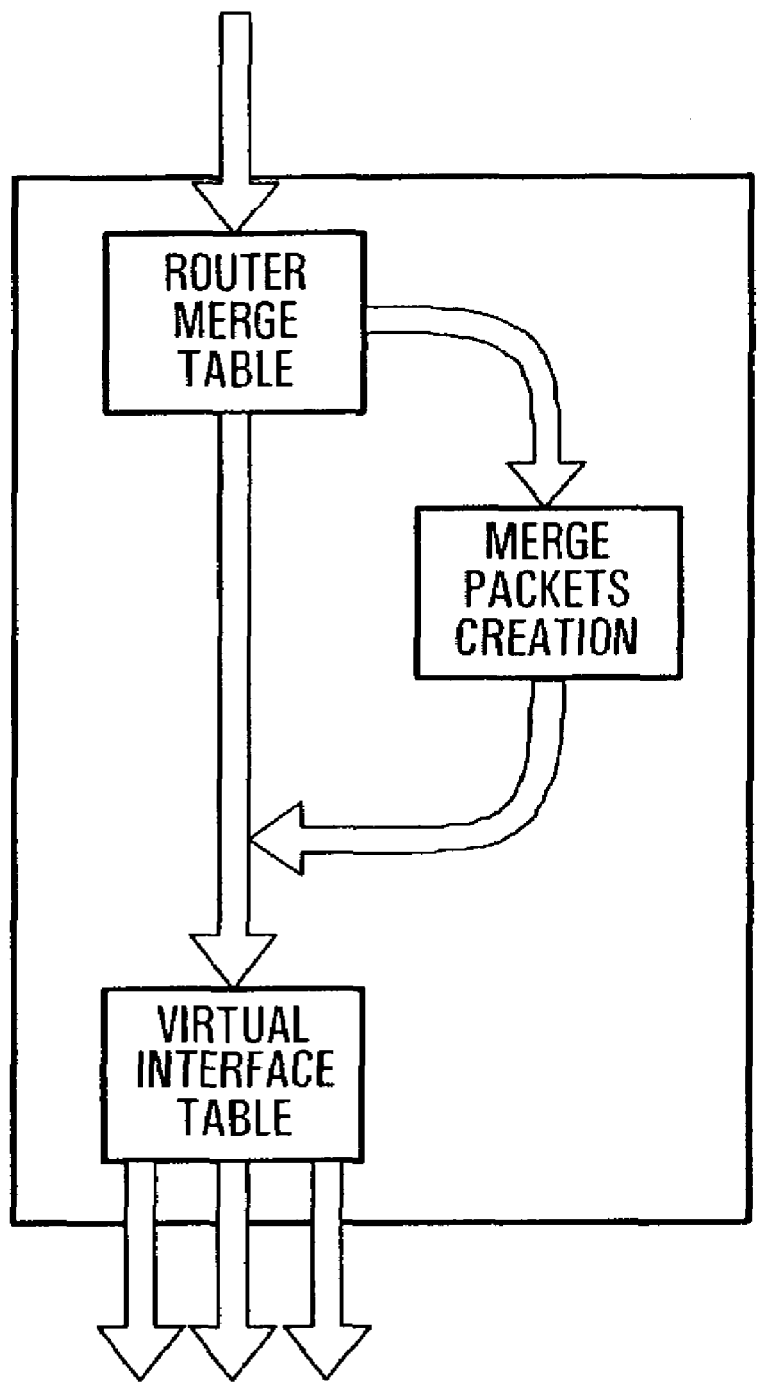
FIG. 17 is a flowchart illustrating steps performed at a router in providing data to merged groups.

Once two multicast groups X and Y are merged, the necessary steps for duplicating packets at a router 16 during the merge operation are detailed in FIG. 17. Upon receipt of a new UDP packet a comparison is made to assess whether the packet is for a multicast in a merged group. If so, a "merged" packet is created. If not the multicast packet is treated as a conventional multicast packet and is handled in the usual manner as for other normal multicast packets.

As illustrated in FIG. 17, only multicast packets with addresses matching with merge group address entries in the router_merge_table 40 (FIG. 7) have their contents duplicated for the corresponding sub-groups. Each of these duplicated packets, known as 'merge packet', will have the corresponding destination multicast address and port modified according to the sub-group address entry in the router_merge_table 40. In other words, this is to send the packet to the multicast address and the merge_port that the sub-group hosts are listening to.

Each "merged" packet has a TTL value of two if the value of the arriving multicast packet has a TTL greater than two. This restricts the "merge" effect of packets to be one hop away from the modified multicast router. If the multicast packet has a TTL of one upon arrival, it is meant to be confined within the sub-network of the router interface where the packet first arrived. Hence the corresponding "merged" packet should also be tagged with a TTL of one, as 'own-net'. This ensures the merged packet is sent back to that same sub-network and will not be forwarded to other sub-networks.

As well, the IP header checksum must be recalculated when the destination multicast address is modified. In addition, the UDP header checksum must also be recalculated when the destination multicast address and port are modified. Failure to recalculate these two checksums may result in the "merged" packets being rejected by routers (if IP header checksum is wrong) or by the corresponding application programs (if UDP header checksum is wrong).

In conventional multicast routers, multicast packets will not be routed back to the incoming interface. This is to prevent loops being created if packets are sent back on the incoming interface. Multicast routers 16, however will route multicast packets back to the incoming interface to allow full merger within a sub-network in the following scenario. A situation of X→Y may arise where some members of sub group X and group Y are both present in the same sub-network. If a host 14 in this sub-network sends packets to group Y, members of X in this sub-network should also receive the packets by virtue of the group merge operation. However the "merged" packets meant for group X will not be routed back to the same sub-network if the multicast router behaves in the original manner. Hence, the multicast packet forwarding decision must be modified to allow only "merged" packets to be sent back on the incoming interface. In addition, "merged" packets that leave the modified multicast router will have their TTL set to one, thus loops will not be created even with the above modification.

Figure 18:
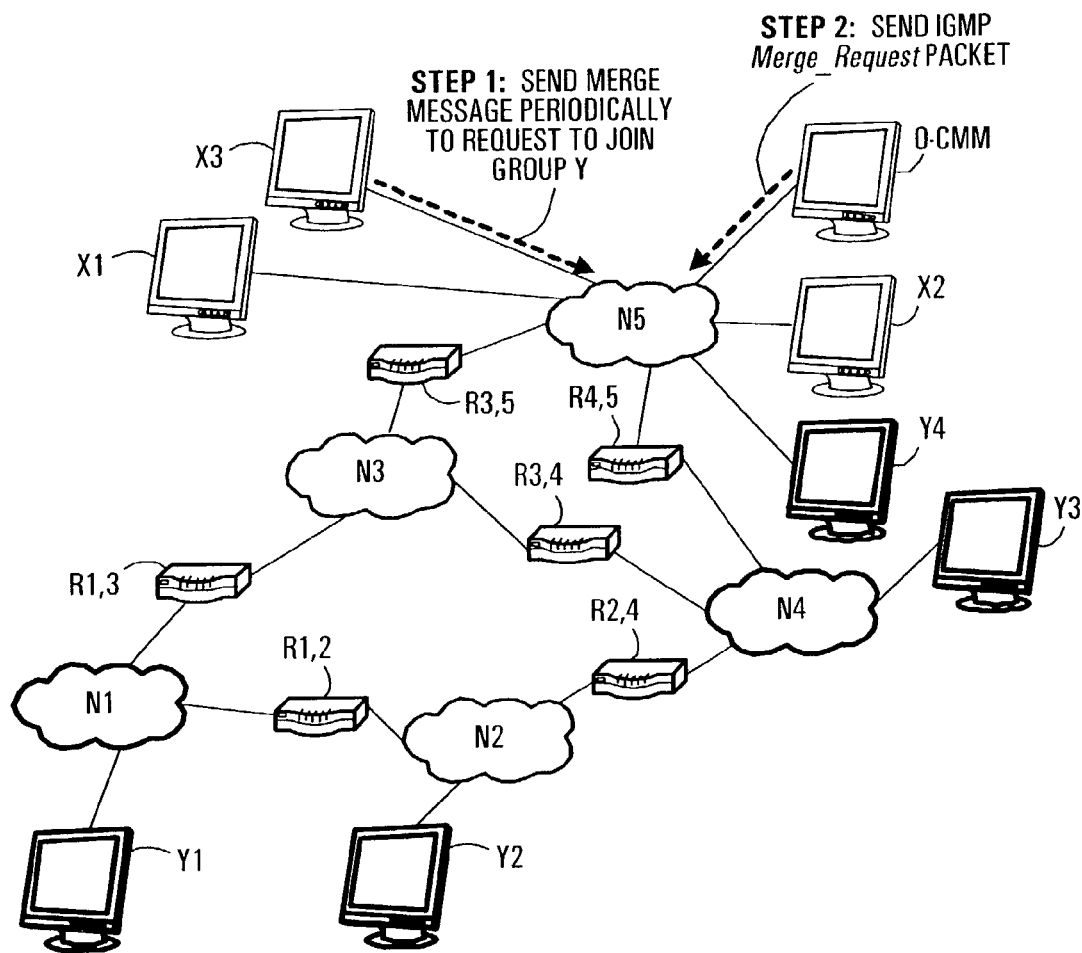
FIGS. 18-20 illustrate various group mergers in the network of FIG. 3.
Figure 19:
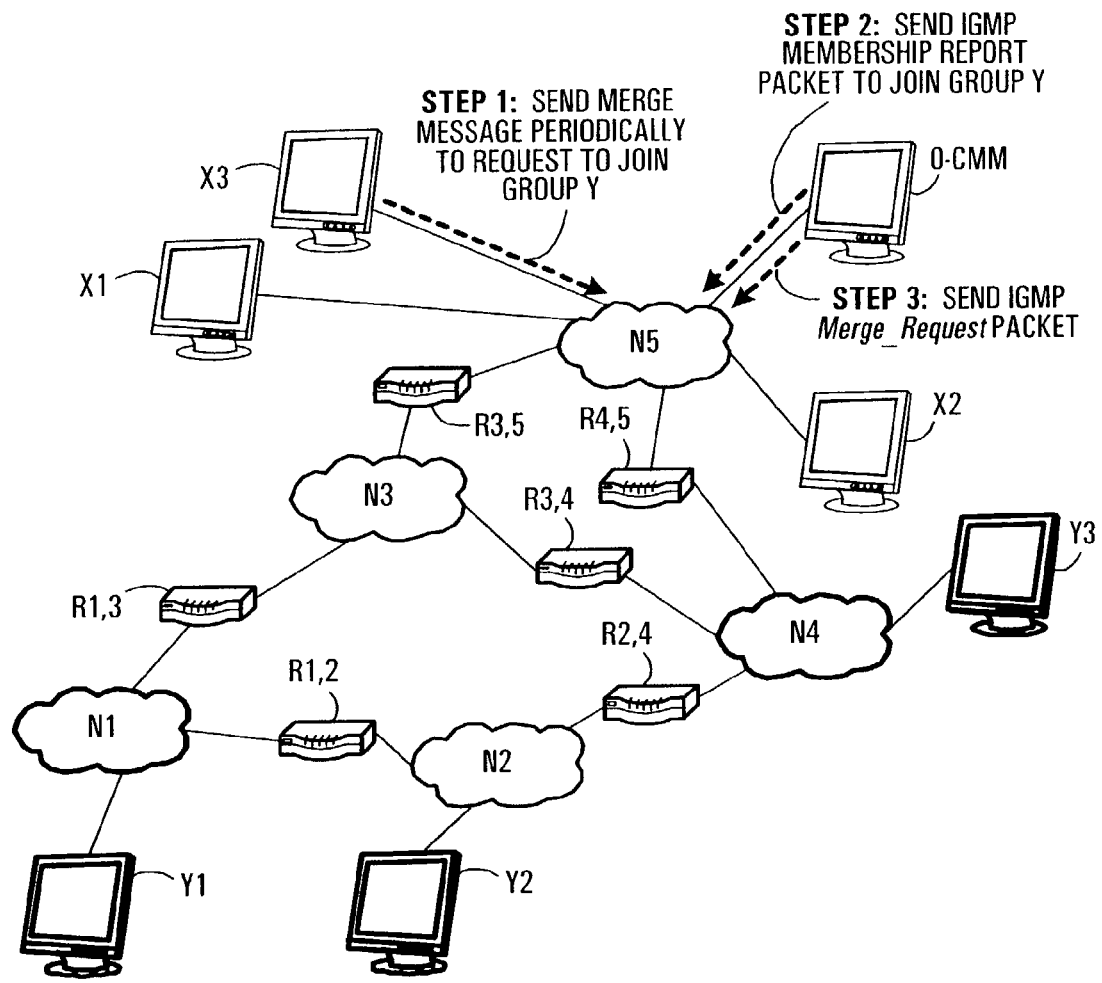
Figure 20:
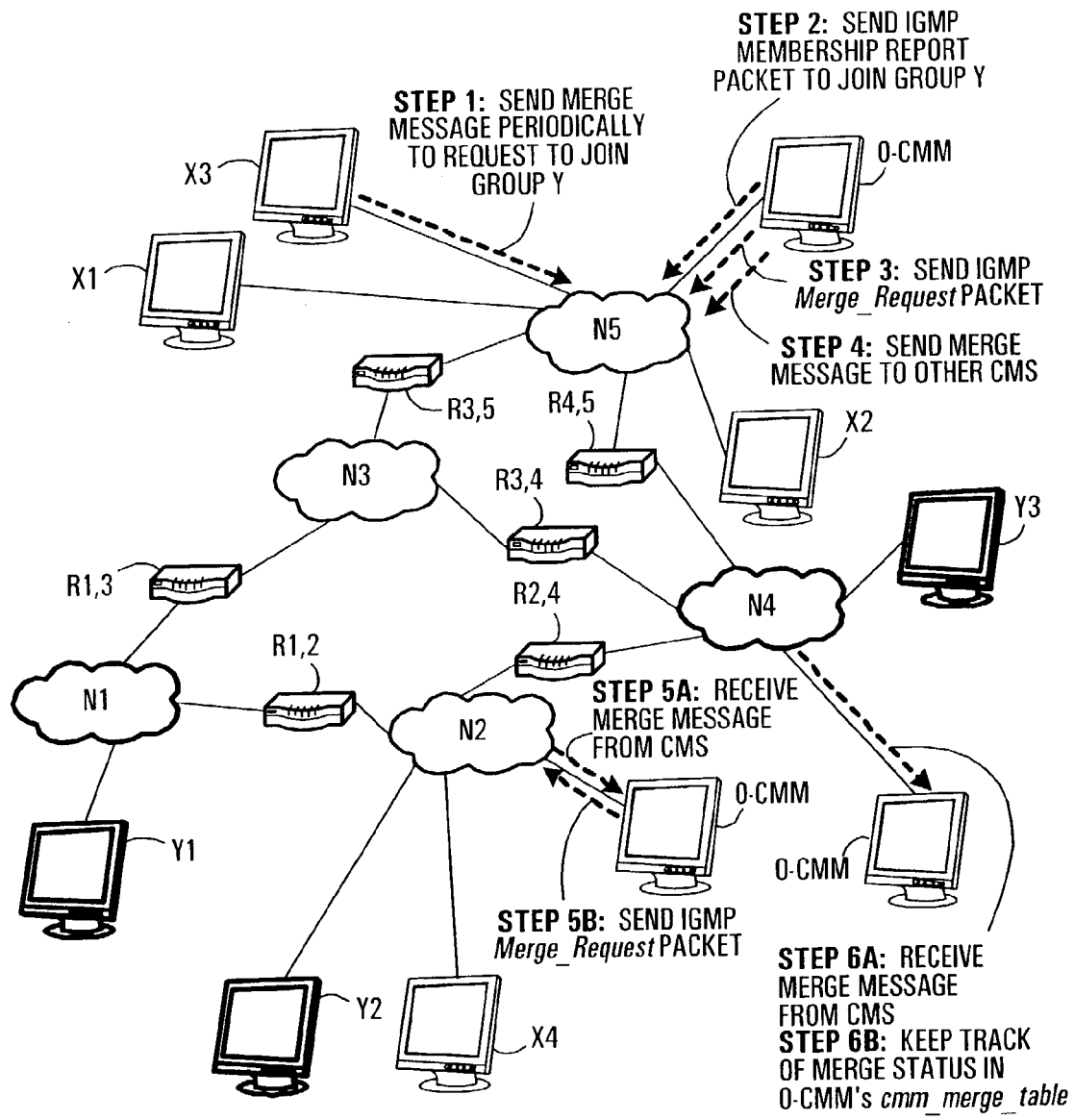

Merging groups may be better appreciated with reference to FIG. 18-20. In the example illustrated, in FIG. 18 all host members of group X (x1, x2 and x3) are attached to the same sub-network (N5). Exemplary of the present invention, only one member of group X needs to send a MERGE message periodically. This is indicated as step 1 in FIG. 18. The request is not dispatched to group Y, instead it is dispatched to the 0-CMM 18 that is in sub-network N5. The 0-CMM 18 receives this request and sends a modified IGMP message (an IGMP_Merge_Request packet) (depicted as step 2 in FIG. 18). The modified router 16 (located in N5, can be router 16 R3,5 or R4,5 in this example) receives this packet and keeps the merge status at the IP level. Subsequent packets for group Y that arrive in sub-network N5 are duplicated and sent to members of group X in sub-network N5 by router R4,5. The modified multicast router is responsible for duplicating these packets to group X.

At the router level, this connection between group X and group Y does not require any changes or extensions to the existing multicast tree. The single IGMP Membership Report is interpreted by the existing or future multicast routing protocol as a single host request for membership. This form of arrangement makes this set of IGMP extensions simple and able to cooperate with existing and future multicast routing protocols.

If members of two merging groups X and Y do not exist in the same sub-network, packets meant for one group can not be duplicated at an associated router to reach members of the other group serviced by that router. To resolve this, the 0-CMM 18 for the sub-network that only has members of one group act as a proxy member to request to join to other group (FIG. 13, step S1312). With this request, a conventional multicast routing protocol is leveraged upon and it is seen as a simple request of a host that wants to join group Y. Membership in the group may be established by the 0-CMM 18 using a conventional IGMP Membership Report as specified in IGMP versions 1 and 2.

This is more particularly illustrated with reference to the example of FIG. 19. In the illustrated example in FIG. 18, a member (y4) of group Y already exists in sub-network N5 when x3 sends a MERGE message. As such, prior to the transmission of the MERGE message as exemplified in FIG. 19, packets for group Y were already sent to sub-network N5. If no members of Y existed in sub-network N5 prior to the transmission of MERGE message, connection manager 0-CMM 18 of sub-network N5 may act as a proxy member for group Y in response to the MERGE message of x3. As illustrated in FIG. 19, a 0-CMM 18 will send a conventional IGMP Membership Report as if he was to join group Y (in step 2). This operation, from the perspective of the multicast router, is seen as a normal operation of a host requesting to join a new group. It effectively links the local default router to the multicast tree of Y. The 0-CMM then sends an IGMP_Merge_Request message 50 to the modified multicast router (step 3 in FIG. 19). This is similar to step 2 of FIG. 18.

In the examples described in FIGS. 18 and 19, the merging of groups only affects one particular sub-network. If, however, members of the joining group X are distributed in different sub-networks as shown in FIG. 20, the 0-CMM 18 (in sub-network N5) will need to propagate the MERGE message to other 0-CMMs on other sub-networks (as indicated in step 4). In fact, this is the preferably default action of all CMMs in response to a MERGE message (see FIG. 13, step S1306), as a particular CMM typically has no knowledge of the distribution of members of any group. As detailed below, connection managers found in the various sub-networks are in-communication with each other. Thus, a MERGE message from one connection manager can be propagated to other connection managers. When a connection manager receives this MERGE message, it can behave in one of two alternative ways:

If there is a member of group X in the corresponding sub-network (as in sub-network N2 in FIG. 20): the connection manager will act as a proxy for Y in this sub-network by sending an IGMP Membership Report packet to join group Y if there is no member of Y in the sub-network, otherwise it sends an IGMP_Merge_Request message 50 to the default modified multicast router (either R1,2 or R2,4). The router in sub-network N2 will maintain the merge status of group X joining group Y.

If there is no member of group X in the corresponding sub-network (as in sub-network N4 in FIG. 20): the connection manager will maintain this merge status in its merge_table 24 (indicated as step 6*a*). Subsequently, when a host in sub-network N4 wants to join group X (and hence to join group Y), the 0-CMM 18 is responsible for sending the corresponding IGMP_Merge_Request message 50. The receipt of the previous MERGE message (step 6*a*) will eliminate the need for the 0-CMM 18 from sending a new MERGE message to other CMMs through the CMS connection network.

Conveniently, only one MERGE message is sent periodically from a designated member of group X (or a designated non-member of the group) to request for a group merge operation. In addition, flooding of IGMP packets in this sub-network is reduced as the connection manager 0-CMM sends only one IGMP_Merge_Request message 50 on behalf of all members of group X. Moreover, only one immediate multicast router 16 (in this case R3,5 or R4,5 in N5 FIG. 20) needs to be modified to interpret the new IGMP message type. Therefore no changes are required for other intermediate routers between the source of the multicast tree to the members in this sub-network. In addition, this merge operation does not need any changes to the existing multicast routing protocol used for construction and maintenance of the conventional multicast tree.

Figure 21:
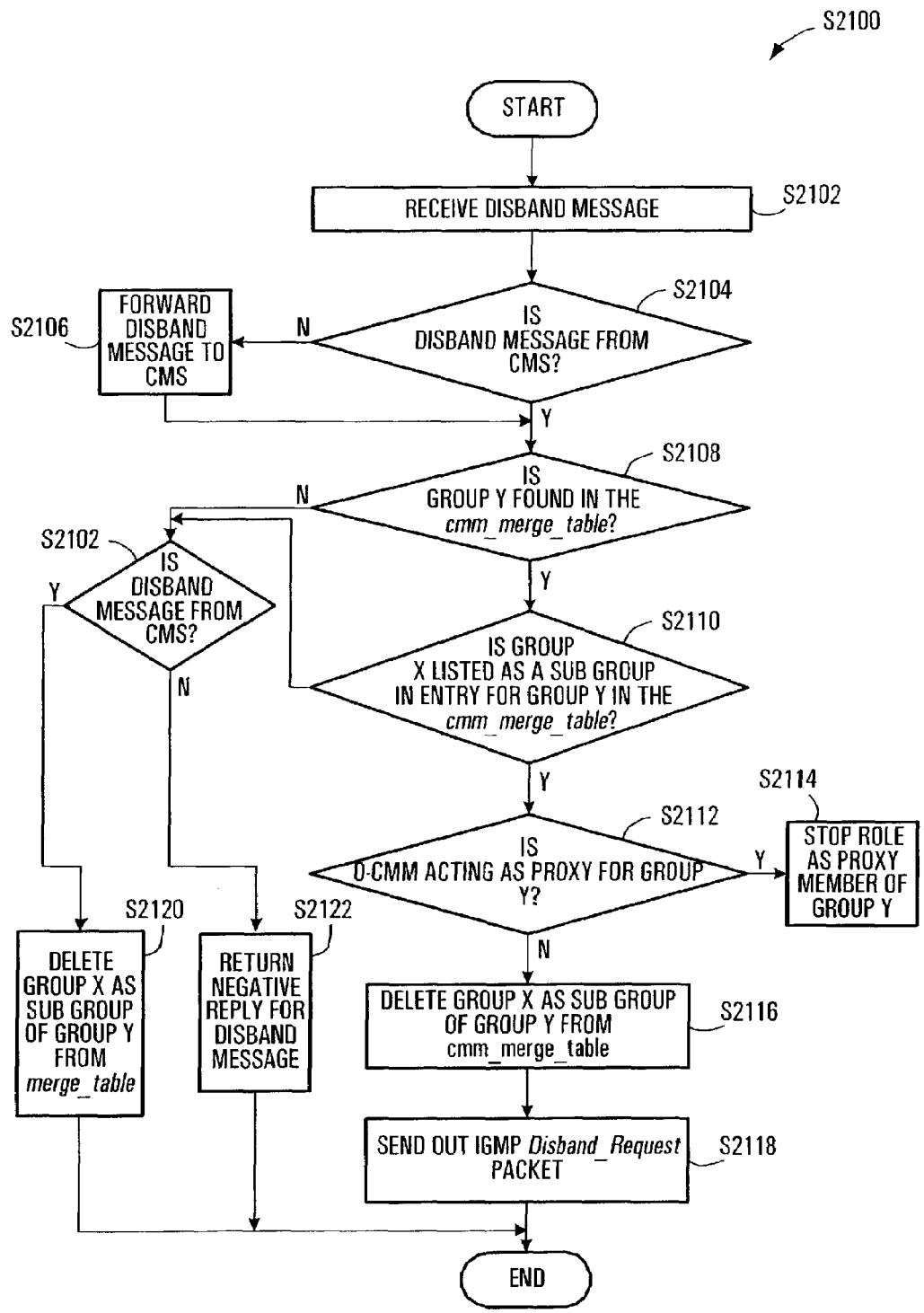
FIG. 21 is a flowchart illustrating steps performed at a connection manager of FIG. 3, to disband merged groups.

Disbanding merged groups is effected in much the same way as merging of the groups. Initially, a designated host 14 wishing to disband merged groups (e.g. group X from group Y) sends a suitable DISBAND message to the 0-CMM 18 on its sub-network. Again, this message may be authenticated as originating from a trusted host in a conventional manner, if required. Steps S2100 performed by the 0-CMM are illustrated in FIG. 21. So, upon receipt of the DISBAND message in step S2102, the 0-CMM 18 assesses if the DISBAND message originates with a host 14 or from the CMS in step S2104. If it originates with a host 14, it is forwarded to other CMMs by way of the CMS in step S2106. If the group Y is not found in the cmm_merge_table data structure 20 (FIG. 4) of CMM 18 as determined in step S2108, or group X is not listed as a sub-group of group Y in the cmm_merge_table as determined in step S2110, the 0-CMM 18 deletes group X as a sub-group of group Y from the merge table in step S2120, for messages from the CMS. Alternatively, it returns an error message in step S2122. If the 0-CMM 18 is acting as a proxy for group Y as determined in step S2112 it ceases to act as a proxy in step S2114. It also deletes group X as a sub-group of Y in its cmm_merge_table 20 in step S2116, and IGMP_Disband_Request message 56 to the neighbouring multicast routers 16 in step S2118 to request for disband of group X from group Y.

Figure 22:
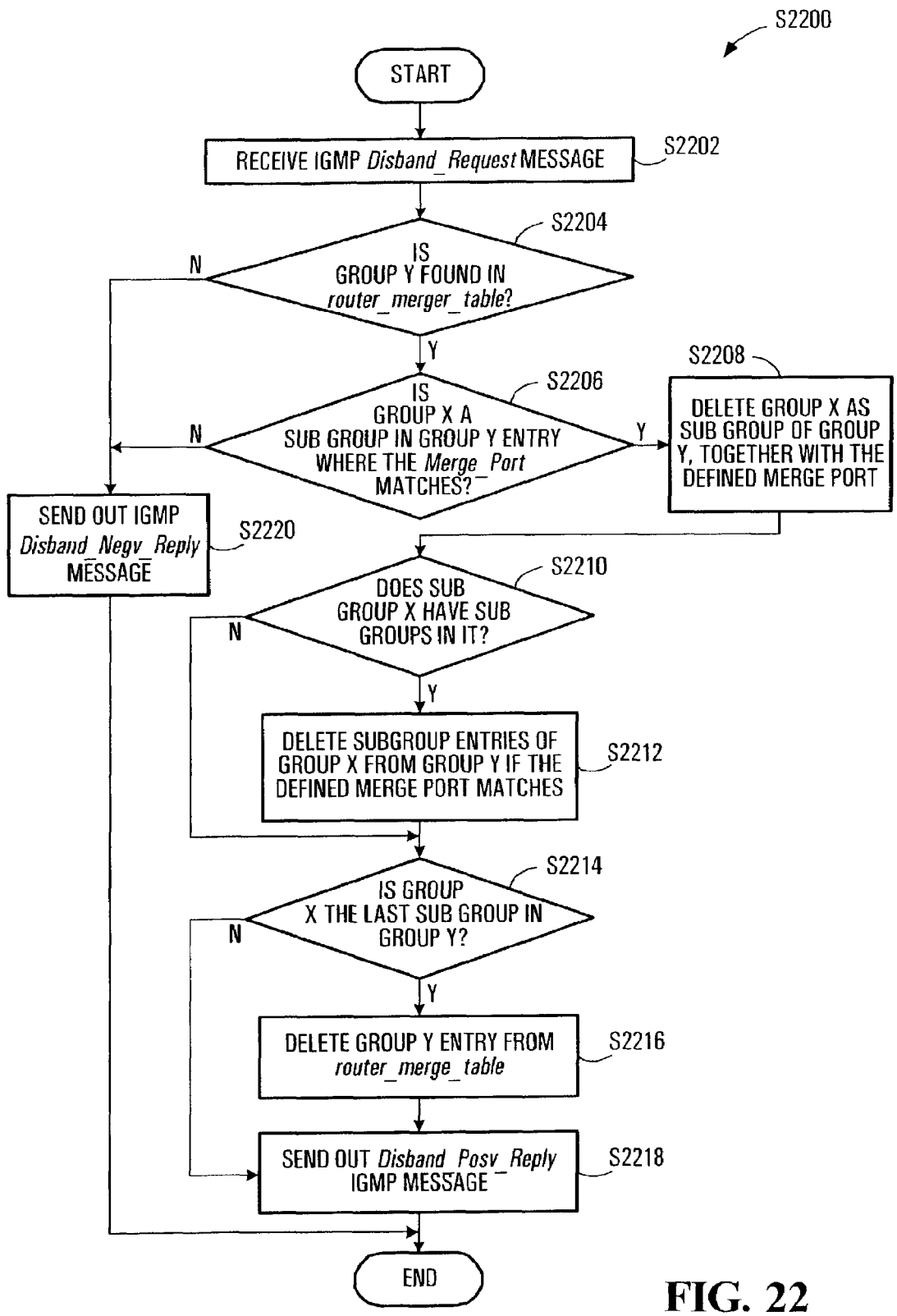
FIG. 22 is a flowchart illustrating exemplary steps performed at a router of FIG. 3, to disband merged groups.

Steps S2200 performed by a router 16 upon receipt of a IGMP_Disband_Request message 56 are illustrated in FIG. 22. When an IGMP_Disband_Request message 56 request for a break in connection between group X and group Y is received in step S2202, the router 16 determines if group Y is in its router_merge_table 40 in step S2204 or if group X is a sub-group in group Y in step S2206. If neither is true, it returns a IGMP_Disband_Negv_Reply message 60 in step S2220. Otherwise, group X is removed as a sub-group of group Y in step S2208. As well, any sub-groups of group X are removed from group Y in steps S2210-S2214. Group Y is removed from the router_merge_table 40 in step S2216. A IGMP_Disband_Posv_Reply message 58 is returned in step S2218.

Figure 23:
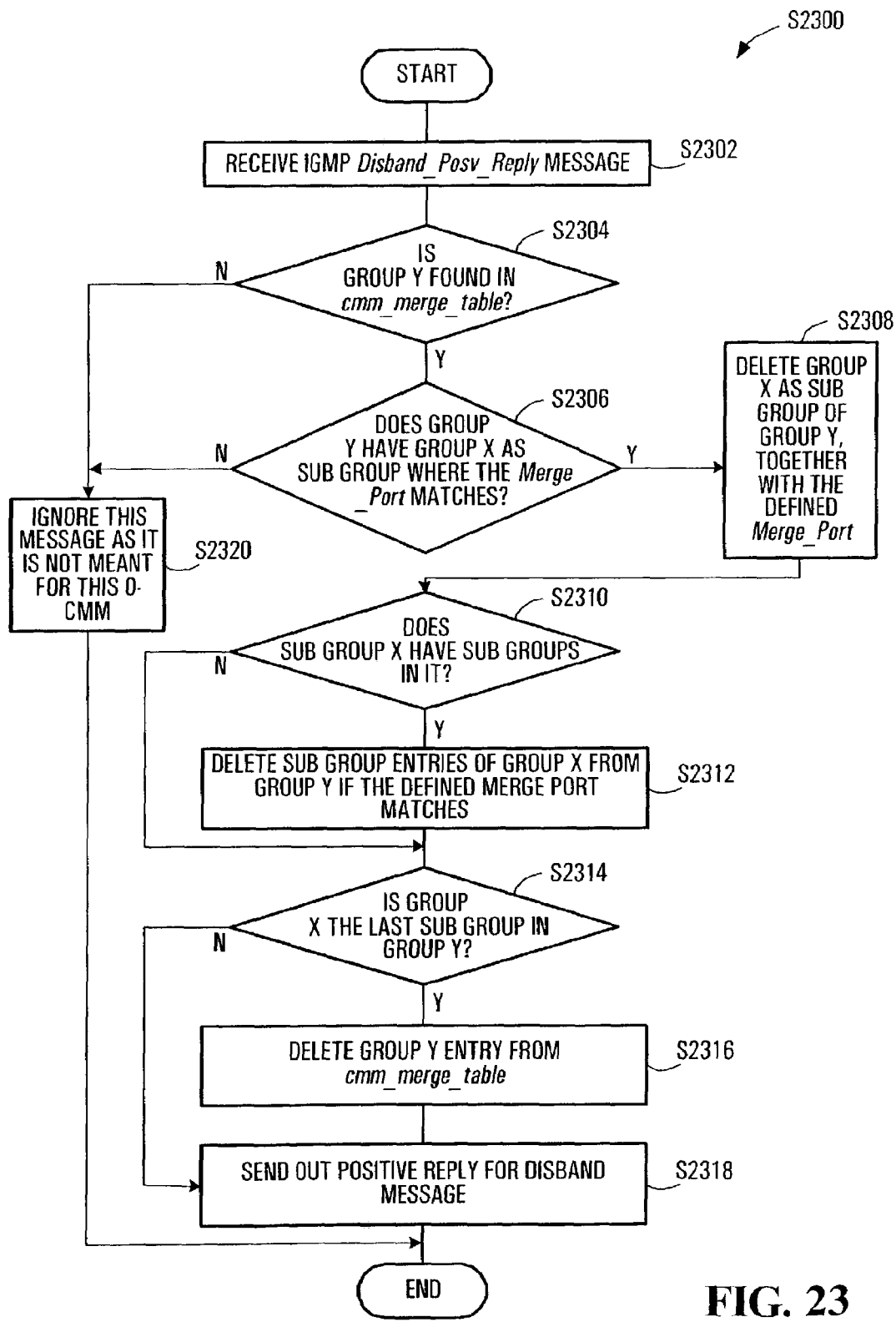
FIG. 23 is a flowchart illustrating steps performed at a connection manager of FIG. 3, to disband merged groups.

The logic of 0-CMM 18 for handling an incoming IGMP_Disband_Posv_Reply message 58 is summarized in steps S2300 in FIG. 23. Steps will not be further detailed herein. The logic is similar to that of the multicast router receiving an IGMP_Disband_Request message 56, as illustrated in FIG. 23. The purpose is to ensure 0-CMM 18 maintains the same knowledge of merge groups as the router. Similarly, the 0-CMM 18 returns a negative reply for the MERGE message if it receives an IGMP_Merge_Negv_Reply message from the router (not shown).

As noted, the multiple CMMs 18 communicate with each other to ensure that MERGE and DISBAND messages are distributed to CMMs 18 at various interconnected sub-networks 12. One computing device acting as a 0-CMM 18 dispatches messages to other computing devices acting as 0-CMMs 18, directly or indirectly, by way of yet other computing device (i.e. making up the CMS). The number of sub-networks 16 may be vast, and hence the organization of inter-communication between 0-CMMs may pose some difficulties. As such, three possible organizations of CMMs facilitating CMM inter-communication are suggested.

Figure 24:
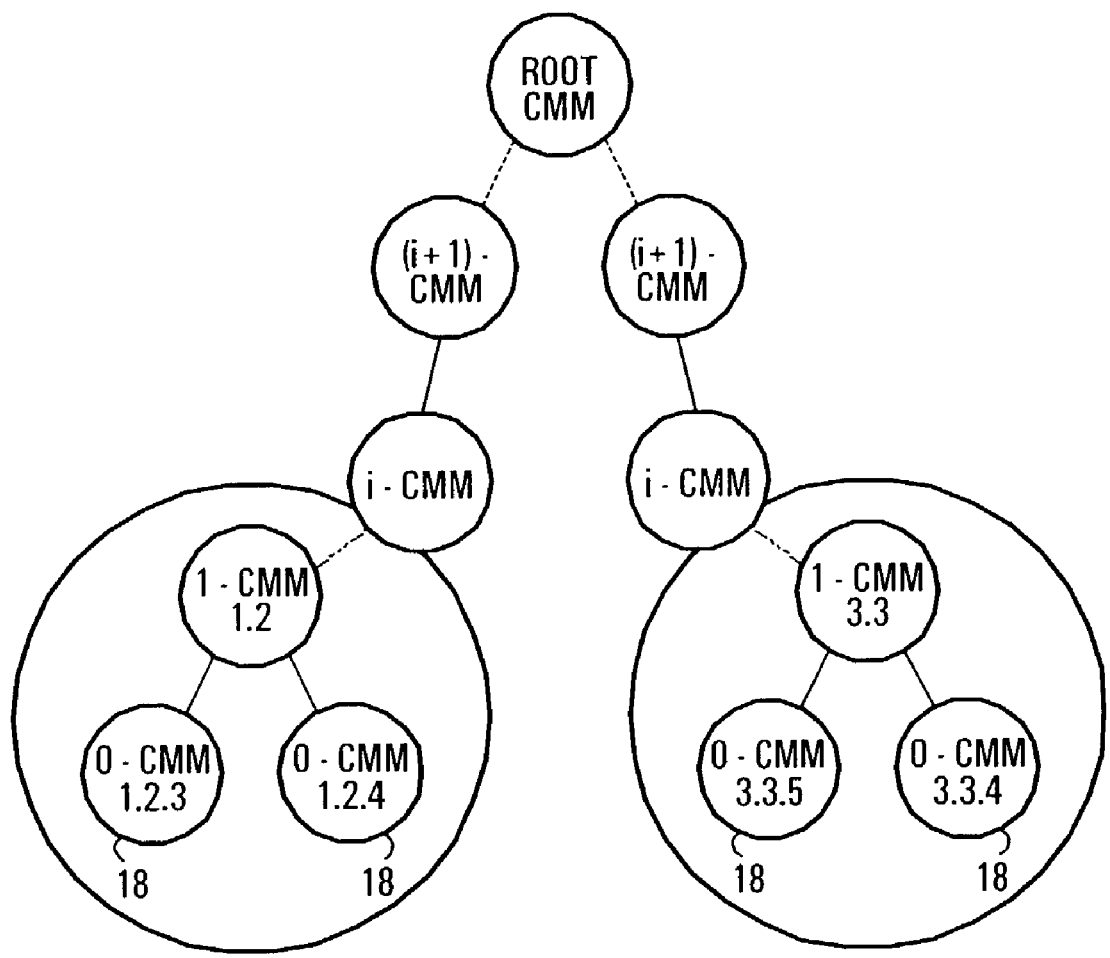
FIGS. 24-26 schematically illustrates possible arrangements of multiple connection managers of FIG. 3.

In a first arrangement illustrated in FIG. 24, computing devices including 0-CMMs 18 are arranged hierarchically. That is, CMMs are arranged in a tree structure. In this tree-like structure, the CMMs are denoted as i-CMM, where i=0, 1, 2, ..., N. The CMMs at the leaf nodes of the trees are 0-th level CMMs (0-CMMs 18). The next level tree nodes, one level higher than the 0-CMM 18, are in turn named as 1-CMMs. Extrapolating this design, the hierarchical setup consists of the interconnection of CMMs, where there will be i-CMM for i number of levels in the tree.

Higher level CMMs (i-CMM (where i>0)) play a significantly different role compared to the 0-CMM 18 in this approach. The key purpose of i-CMM is to set up a hierarchical information base of the group membership. i-CMM is authoritative over several 0-CMMs 18 it monitors. An i-CMM can have several (i−1)-CMMs connected to it as children but only one (i+1)-CMM connected to as a parent The i-CMMs transmit MERGE and DISBAND messages to other CMMs in two possible ways. First, if a message is received from a (i−1)-CMM, the i-CMM retransmits this message to its other children (i−1)-CMMs and parent (i+1)-CMM. Second, if a message is received from the parent (i+1)-CMM, the i-CMM retransmits this message to all its children (i−1)-CMMs. Typically, a MERGE or DISBAND message will propagate from 0-CMM 18 all the way to the root N-CMM, and then be retransmitted to the rest of CMMs in the CMS tree.

An acknowledgement mechanism can be put in place to ensure that the transfer of MERGE and DISBAND messages between CMS' is reliable. This can be achieved by having the recipient (e.g. 1-CMM) of a message (e.g. a MERGE message) acknowledges to the sender (e.g. 0-CMM 18) the receipt of that request. If the sender fails to receive any acknowledgement within a time out period, it will attempt to re-send the message again.

In addition, the i-CMMs interacts with (i+1)-CMMs and (i−1)-CMMs to provide a network-wide awareness of the distribution of hosts and their corresponding multicast memberships in the CMS. This is achieved by having the 0-CMM 18 periodically update the CMM one level higher (i.e. 1-CMM) about the group subscription in its sub-network. The 1-CMM, in turn, updates this group information to 2-CMM and so on and so forth. This knowledge is used to determine the list of multicast groups present in an i-th domain. In addition, information about the multicast groups are aggregated for CMMs found in the higher levels. This means the 0-CMMs 18 keep the detailed information of the IP addresses of hosts (that have subscribed to the corresponding multicast addresses), while the i-CMMs maintain the list of multicast groups less the details of host information. In this way, an i-CMM can be more efficient in targeting a MERGE or DISBAND message be repeated to 0-CMMs 18 where related hosts for these group operations could be found. Specifically, i-CMMs can filter MERGE or DISBAND messages so that only those destined for 0-CMMs under them are passed on to lower level i-CMMs.

In all, the hierarchical CMS is responsible for ensuring that a merge or disband request is complete for a particular group.

Figure 25:
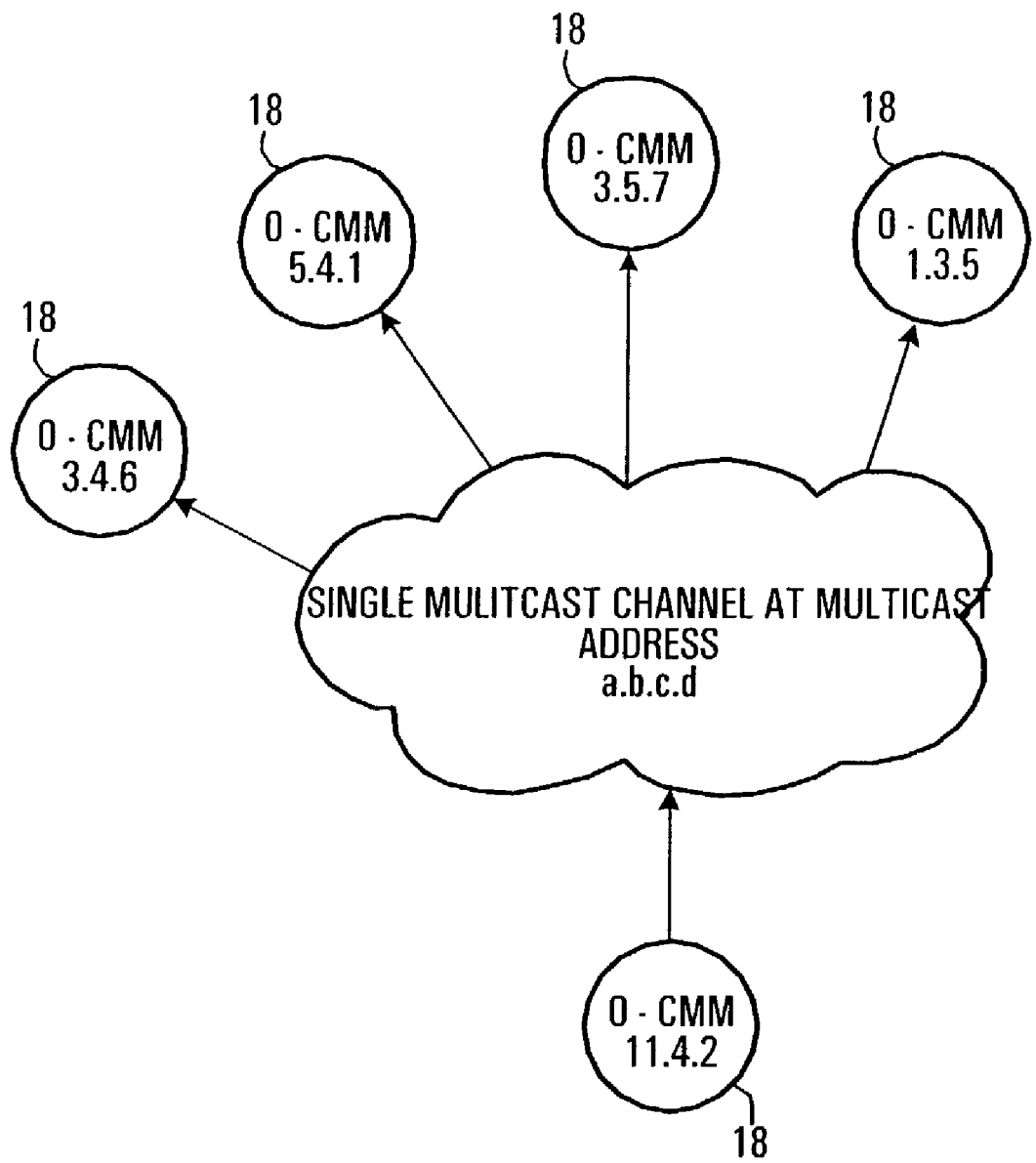

An alternate arrangement of CMMs is illustrated in FIG. 25. In this arrangement, the 0-CMMs 18 interact with each other through a single multicast channel. As illustrated, an example single message sent from 0-CMM 11.4.2 to the multicast address a.b.c.d is received by the other 0-CMMs 18 (who are subscribed to the same a.b.c.d multicast address). This method assumes that all 0-CMMs are connected through multicast-enabled routers. However, for 0-CMMs connected to non multicast-enabled routers, IP tunneling can be used to bridge these 0-CMMs 18 to the multicast channel.

In this arrangement, as exemplified in FIG. 25, the 0-CMMs 18 transmit MERGE and DISBAND messages received from end hosts to the common multicast channel. When a 0-CMM receives a MERGE or DISBAND message from the multicast channel, it responds by sending the corresponding IGMP_Merge_Request or IGMP_Disband_Request messages 50, 56 to the neighbouring modified multicast router 16. Through this simple method, a merge or disband request from one sub-network can be transmitted to the rest of the CMS. The reliability of this type of CMS depends on the ability of the underlying network mechanism to support a reliable multicast.

Figure 26:
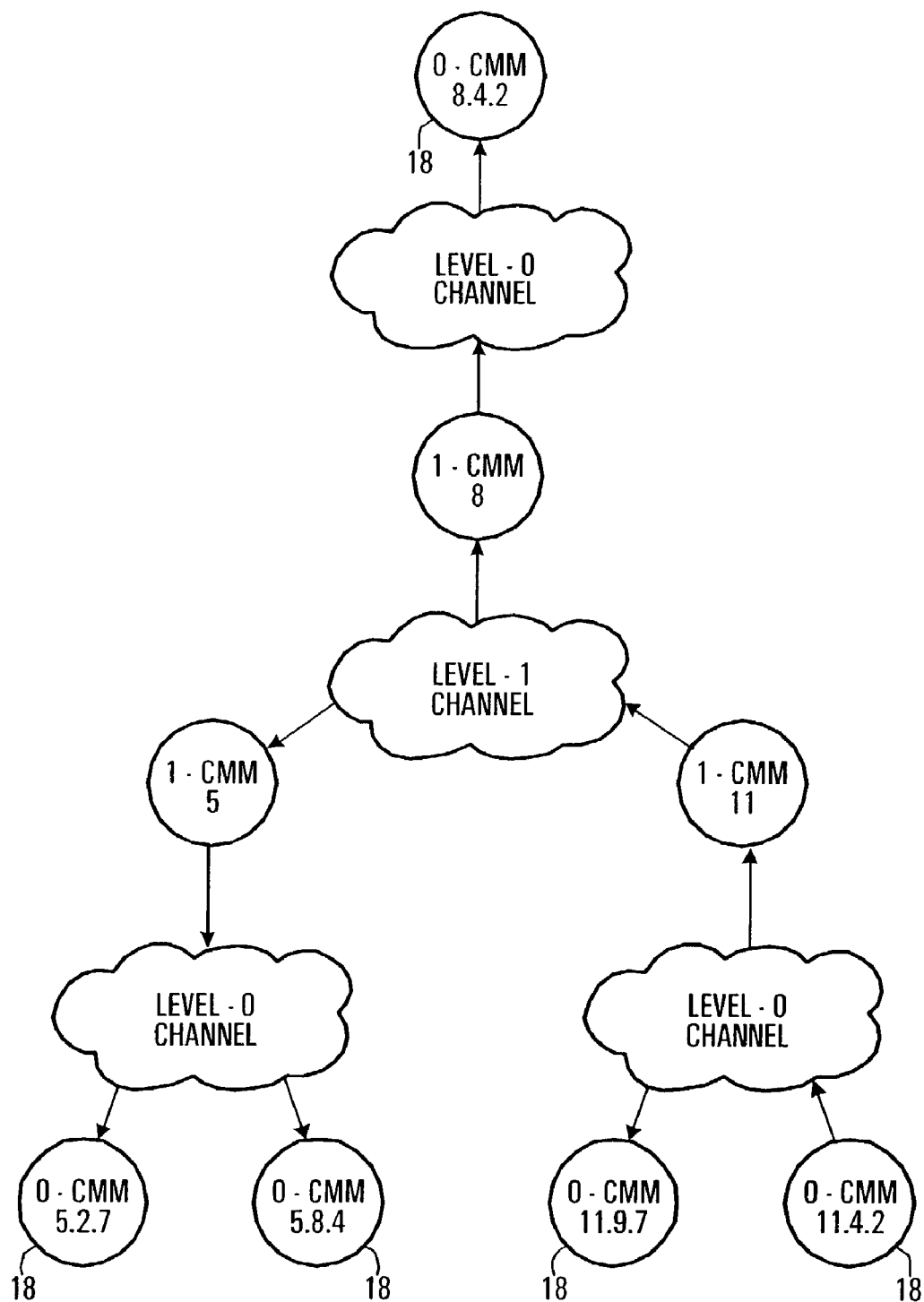

A third alternate arrangement of CMMs is illustrated in FIG. 26. This is a hybrid approach of the hierarchical tree-like setup and the single multicast channel set-up. As before, each sub-network will have one 0-CMM 18. These 0-CMMs 18 are further grouped into regional 0-level subgroups each consists of several 0-CMMs 18. The members of each 0-level regional subgroup are connected through a level-0 multicast channel. Each level-0 regional subgroup of 0-CMMs is represented by a higher level CMM, in this example, a 1-CMM. As in the case of 0-CMMs, these 1-CMMs are grouped into subgroups each with a level-1 multicast channel connecting all their members. This process can be repeated until the root level N. For practical reason, N is preferably kept small.

The 0-CMMs are members of multicast address a.b.c.d port X. This multicast address-port pair (termed level-0 channel) is used for communication between 0-CMMs 18 and a 1-CMM in neighbouring network. The scope of the neighbouring network can be limited. For example, if the limit is chosen to be 5 hops, a 1-CMM will listen only to multicast messages from 0-CMMs 18 found within this limit of 5 hops. Using this approach, there will be numerous 1-CMMs listening to 0-CMMs 18 within the scope of 5 hops.

The various 1-CMMs, in turn, will subscribe to multicast address a.b.c.d port Y (termed level-1 channel) for interaction among the 1-CMMs. A typical example is shown in FIG. 26, where a MERGE message is sent from 0-CMM 11.4.2 and is received by 1-CMM 11 from level-0 channel. 1-CMM 11, in turn, will transmit this same message to multicast address a.b.c.d port Y. The various 1-CMMs listening to the level-1 channel will retransmit it to the level-0 channels that they are attached to. Through this method, a merge or disband request from one sub-network can be transmitted to the rest of the CMS. If the MERGE message is received from a 0-CMM, the 1-CMM will retransmit it to the level-1 channel it is attached to.

The reliability of transmissions in this CMS can be assured as follow: Using the two-level CMS example as depicted in FIG. 26, the 1-CMM may maintain a list of 0-CMMs found in the same level-0 channel in a data structure called 0-CMM_table. In addition, it may maintains a list of 1-CMMs found in the same level-1 channel in a data structure called 1-CMM_table. The 1-CMM listens in level-0 channel for acknowledgements from all the other 0-CMMs upon their receipts of a MERGE or DISBAND message. If a 0-CMM fails to respond, 1-CMM will attempt to resend the same message. If the particular 0-CMM does not respond after the $k^{th}$ resending attempts (to be determined during implementation), 1-CMM will remove the corresponding entry from 0-CMM_table. On the other hand, when a new 0-CMM enters the same level-0 channel, the 1-CMM creates a new entry in the 0-CMM_table and will retransmit MERGE or DISBAND message to that 0-CMM.

Likewise, a 1-CMM also listens in on the level-1 channel for acknowledgement from members of 1-CMMs for a MERGE or DISBAND message relayed to them (by this 1-CMM, e.g. 1-CMM 11 in FIG. 26). If a 1-CMM member fails to respond, this 1-CMM will attempt to resend the same message. If the particular 1-CMM does not respond after its $k^{th}$ resending attempts (to be determined during implementation), this 1-CMM will remove the corresponding entry from 1-CMM_table. Essentially, the reliability of messaging with the CMS is ensured by the retransmission mechanism of the parent CMM of level-i channel (e.g. 1-CMM 5, 11, 8 for level-0 channels and 1-CMM 11 for level-1 channel in FIG. 25).

As will be appreciated, regardless of which approach of the suggested arrangements of CMMs is used for constructing CMS, the 0-CMMs found in these three approaches play the same role.

In the above described embodiments, IGMPv1 or IGMPv2 is used to allow merging and disbanding of multicast groups. A person of ordinary skill will readily appreciate that the invention may be suitably adapted for use with other protocols. For example, the invention may be used with IGMPv3.

IGMPv3 adds support for 'source-filtering'. This means a host can specify from which source it would like to receive packets from, or it can specify from all but some specific addresses to receive packets from. A typical IGMPv3 packet contains a 'source-list' from which to receive packets from or to exclude from receiving To leverage the additional capability of 'source-filtering' provided by IGMPv3, methods exemplary of this invention can be extended to provide support for IGMPv3 and of 'source-filtering' between groups. Steps performed at CMMs and routers as detailed above, however, do not require significant modification.

Using 'source-filtering' between groups, the sub group X can specify it only wants to receive packets sent to group Y from a list of sources in addition to a merge between two groups. This is achieved by adding additional options to the code field in the packet, an additional 16 bit field for specification of the number of sources, and N source addresses for N specified sources. This is described in the following sub sections.

Figure 27A:
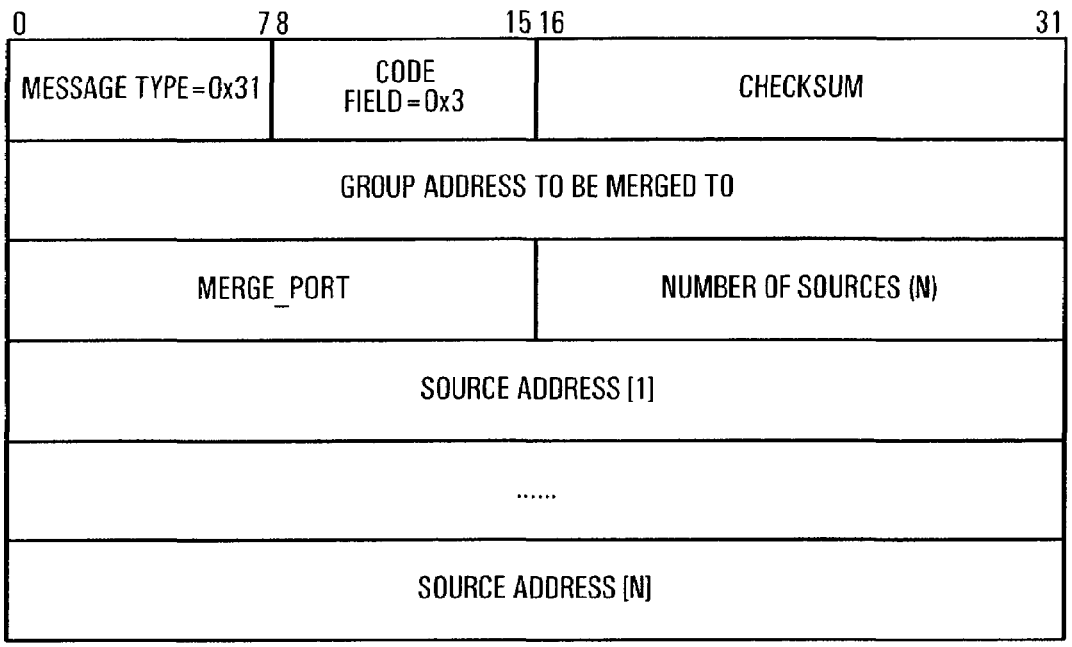

FIG. 27A illustrates a modified IGMPv3 Merge_Request message type. The code field of 0x3 indicates this is a merge request with a list of source addresses for inclusion. As such, if group X requests to listen to multicast packets sent to group Y from this list of source addresses. An additional 16-bit field is added for specification of the number of sources. Following this, N records of 32-bit unicast source addresses are specified for the N sources from which multicast packets are to be received.

Figure 27B:
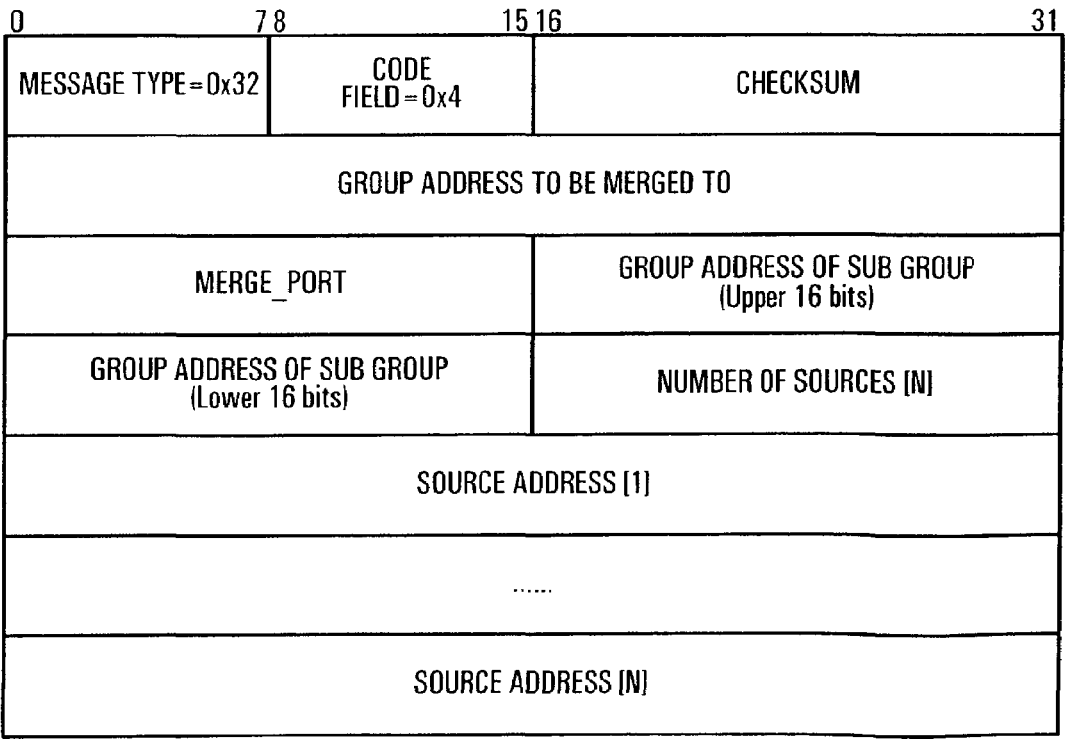

FIG. 27B illustrates a modified IGMPv3 Merge_Posv_Reply message type. The code field of 0x4 indicates this is a successful merge request with a list of source addresses for inclusion. Similar to FIG. 27A, a 16-bit field is used to specify the number of resources, and N records of 32-bit unicast source addresses are specified for inclusion.

FIG. 27C illustrates a modified IGMPv3 Merge_Negv_Reply message type. The code field of 0x5 indicates this is a failure in processing the merge request with a list of source addressed for inclusion. The rest of the fields are similar to those illustrated in FIG. 27B.

For disband requests, the packet format (not shown) is similar to that for the merge requests. The code fields are the same as those used in merge requests and replies. The message type of 0x33 indicates it is an IGMPv3 Disband_Request and message type of 0x34 indicates it is an IGMPv3 Disband_Posv_Reply or Disband_Negv_Reply message.

FIG. 27D illustrates a modified IGMPv3 Merge_Request message with the exclusion of sources option. The code field of 0x6 indicates this is a merge request with a list of source addresses for exclusion in receiving packets. This means sub group X is requesting NOT to receive multicast packets sent to group Y by sources to be listed in the request. A 16-bit field is used to specification of the number of such sources, followed by N records of 32-bit unicast source addresses which are the specific N sources from which multicast packets are not to be received.

FIG. 27E illustrates a modified IGMPv3 Merge_Posv_Reply message type. The code field of 0x7 indicates this is a successful merge request with a list of source addresses for exclusion. Similar to FIG. 27D, a 16-bit field is used to specify the number of resources, and N records of 32-bit unicast source addresses are specified for exclusion.

FIG. 27F illustrates a modified IGMPv3 Merge_Negv_Reply message type. The code field of 0x8 indicates this is a failure in processing the merge request with a list of source addressed for exclusion. The rest of the fields are similar to FIG. 27E.

For disband requests, the packet format (not shown) is similar to that for the merge requests. The code fields are the same as those used in merge requests and replies. The message type of 0x33 indicates it is an IGMPv3 Disband_Request and message type of 0x34 indicates it is an IGMPv3 Disband_Posv_Reply or Disband_Negv_Reply message.

If a router only supports IGMP v2 and does not support IGMPv3, the IGMPv3 Merge_Request and Disband_Request message types, as suggested, will be processed like the request messages. This means these modifications will not affect the normal working of routers who can only support IGMPv2. In addition, an IGMPv3-aware multicast router will keep a filter-mode and a list of source records for each sub group in the router_merge_table 40. The router will check the filter-mode and list for inclusion or exclusion of packets sent from the specified list of sources.

At present, IGMP is no longer the protocol used for group membership management in IPv6. Instead, functions from IGMP are incorporated into ICMPv6 to provide support for group membership management. The packet formats for the defined message types remain the same when used in ICMPv6. The only difference is that there is a change in the specification of message types in ICMPv6. FIG. 28 shows a table illustrating the corresponding message types of ICMPv6 to provide group merge and disband capabilities in IPv6. In addition, there will be a change from using 32-bit to specify an IPv4 address to using 128-bit to specify IPv6 address.

As will now be appreciated, in the above embodiments, the merging and disbanding of groups use extended operations of IGMP or ICMP and is therefore independent on the IP routing protocol. In fact, when a 0-CMM 18 plays the role of a proxy member to extend a multicast tree network to its sub-network by sending a IGMP Membership Report, the multicast routing protocol may view this as an usual single host asking for membership. This allows the invention to be embodied in existing multicast routing algorithms as well as any of the future multicast routing algorithms (if any).

To support the IGMP extensions, only the immediate IP routers of the sub-networks need modifications; other intermediate routers, including backbone routers need not be aware of the group merging and disbanding operations and therefore they remain unchanged. The modifications are largely for the handling of the extended IGMP messages and the maintenance of group status within that sub-network; they will not affect the normal IP routing and IP multicast operations.

The provision of complex group structures allows cascading of groups to match complex business unit structures in organizations. By creating complex group structures, real world needs and relations can be translated to relationships at network level. This will incur less overhead compared to existing applications where such relationships are maintained at the application level.

In view of the proliferation of wireless network, e.g. provision of subscription to wireless LAN access, people forming groups can gracefully merge and disband to have informal group communications. Lower overhead will benefit the wireless applications greatly.

In addition, as the merge port is maintained at the router and not at the host, this enables hosts to receive packets from a number of multicast groups though they have subscribed to only one multicast address and port. The necessary modifications of the original multicast address and port to the matching address and port these hosts are listening to are performed at the network level by the router. As such, multiple ports at a host need not be available to merge groups.

As should be appreciated, multicast group merging as described herein allows coordination of meetings between two parties for any number of applications. Higher level applications can initiate group mergers and disband them, and can process multicast packets as desired. Conveniently, a sub group can choose to continue their own private multicasts even as they are in the merged state with another group, receiving the other group's multicast.

For example, there may be a strong demand for dynamic and creative usage of group communications in the scope of education services. An example will be a classroom scenario, whereby trainees forming groups will represent individual multicast groups and they can have their own private communication. Occasionally, the teacher (as a group) can merge with one or more of the groups to monitor the group's progress.

In fact, as more creative and complex group applications are created, a scenario may occur where secure inter and intra group communications provides the platform for more creative ways of school projects in the future.

Persons of ordinary skill will readily appreciate many more application of embodiments of the present invention.

All documents referred to herein are hereby incorporated by reference herein, for all purposes.

Of course, the above described embodiments, are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of merging first and second internet protocol (IP) multicast groups in a packet switched computer network comprising a plurality of sub-networks, each of said IP multicast groups identified by unique IP multicast addresses, and wherein members of said first and second IP multicast groups have registered to receive multicast packets identified by said first and second IP multicast addresses, respectively, said method comprising receiving a request over said packet switched computer network to merge said first and second IP multicast groups at a computing device, said computing device operable to receive requests to merge multicast groups from multiple hosts on said packet switched computer network;

dispatching a request from said computing device over said packet switched computer network to merge said first and second IP multicast groups to an edge router connecting one sub-network to other sub-networks;

at said edge router, in response to said request, forming duplicate data packets containing data provided to said first IP multicast group, and having said IP multicast address of said second IP multicast group, thereby providing said data from said first IP multicast group to said members of said second IP multicast group in said one sub-network.

2. The method of claim 1, further comprising maintaining indicators of memberships in IP multicast groups of said multiple hosts at said computing device.

3. The method of claim 2, further comprising monitoring requests to join IP multicast groups, originated at said multiple hosts.

4. The method of claim 1, wherein said computing device is on said one sub-network, and wherein said method further comprises joining said second IP multicast group at said computing device to act as a proxy for said second IP multicast group on said one sub-network.

5. The method of claim 1, further comprising dispatching a request to merge said first and second IP multicast groups to other computing devices, each of said other computing devices operable to receive requests to merge other multiple hosts on said network.

6. The method of claim 5, wherein said request to merge said first and second IP multicast groups is dispatched to said other computing devices, by way of a multicast connection.

7. The method of claim 5, further comprising passing a request to merge said first and second IP multicast groups to a higher level computing device, said higher level computing device interconnecting multiple of said other computing devices to provide requests to merge multicast groups.

8. The method of claim 1, further comprising receiving a request to merge other multicast groups at said computing device from another computing device, said another computing device operable to receive requests to merge groups from other multiple hosts on said network;

responsive thereto dispatching a request from said computing device to merge said other IP multicast groups to said edge router connecting said one sub-network to other sub-networks.

9. The method of claim 1, further comprising receiving a request to disband merger of said first and second IP multicast groups at said computing device;

dispatching a request from said computing device to disband merger of said first and second IP multicast groups to said edge router connecting said sub-network to other sub-networks, thereby signalling said edge router to cease duplicating data in packets for members of said first IP multicast group to members of said second IP multicast group in said one sub-network.

10. The method of claim 1, further comprising maintaining a list of merged IP multicast groups at said computing device.

11. The method of claim 10, further comprising updating said list to reflect merger of said first and second IP multicast groups.

12. The method of claim 5, wherein said IP multicasts have been established using an IGMP protocol.

13. The method of claim 1, further comprising authenticating an originator of said request to merge to ensure said request to merge originates with an authorized computing device.

14. The method of claim 1, wherein said receiving comprises receiving said request to merge from a computing device belonging to said first IP multicast group.

15. The method of claim 1, wherein said receiving comprises receiving said request to merge from a computing device belonging to neither said first or said second IP multicast group.

16. The method of claim 1, wherein said computing device is on said one sub-network, and wherein said method further comprises having a computing device on said one sub-network act as a proxy for said second IP multicast group on said one sub-network.

17. Computer readable medium, stored with computer executable instructions loadable by processor at said computing device within said network, adapting said computing device to perform the method of claim 1.

18. A method of operating an edge router connecting a sub-network to a packet switched network, comprising:

maintaining a list of at least one merged IP multicast groups, said list comprising a IP multicast address identifying said merged multicast group, and a plurality of unique IP multicast addresses identifying a plurality of member IP multicast groups that are to be merged at said edge router, wherein individual members of each of said plurality of member IP multicast groups have previously registered to receive multicast packets identified by the IP multicast address of that IP multicast group;

duplicating data in packets having the IP multicast address identifying said merged multicast group, in data packets having the IP multicast address of each of said plurality of member groups, thereby providing multicast data directed to said merged multicast group, to all members of said plurality of member IP multicast groups on said sub-network.

19. The method of claim 18, further comprising updating said list in response to requests received from a computing device on said sub-network.

20. The method of claim 19, wherein said requests comprise requests to merge established multicast groups, or disband merged multicast groups.

21. The method of claim 20, wherein said method comprises adding at least one entry to said list in response to a requests to merge established IP multicast groups.

22. The method of claim 21, wherein said method comprises deleting an entry of said list in response to a requests to disband established multicast groups.

23. The method of claim 22, further comprising deleting an entry of said list after expiry of a time-out period.

24. The method of claim 19, further comprising adding destination addresses to packets destined for said members of a merged multicast group on said sub-network.

25. The method of claim 19, including a time-to-live value of two or less in said packets destined for said members of said merged multicast group on said sub-network.

26. The method of claim 21, further comprising adding multiple entries to said list to merge groups already merged with a particular group in response to a request to merge said particular group with another multicast group, thereby merging said groups already merged with said another multicast group.

27. The method of claim 26, further comprising removing said multiple entries from said list in response to a request to disband merger of said particular group with said another multicast group.

28. The method of claim 18, wherein said duplicating data in packets further comprises readdressing said packets with said IP multicast address of each of said multicast groups in said plurality of multicast groups to be merged.

29. The method of claim 28, further comprising calculating and modifying the IP header checksum of said packets after said readdressing.

30. Computer readable medium, stored with computer executable instructions loadable by processor at a router within a communication network, that adapt said router to perform the method of claim 18.

31. A router comprising a processor and processor readable memory, said processor readable memory storing instructions adapting said router to maintain a list of at least one merged multicast groups, said list comprising an IP multicast address identifying said merged multicast group, and a plurality of unique IP multicast addresses identifying a plurality of member IP multicast groups that are to be merged at said router, wherein individual members of each of said plurality of member IP multicast groups have previously registered to receive IP multicast packets identified by the unique IP multicast address of that multicast group;

duplicate data in packets having the IP multicast network address identifying said merged multicast group, in data packets having the IP multicast address of each of said plurality of IP multicast member groups, thereby providing multicast data directed to said merged multicast group, to all members of said plurality of member IP multicast groups on a sub-network.

32. A method of operating an edge router connecting a sub-network to a packet switched network, comprising:

receiving a multicast data packet for a first multicast group on said sub-network, said multicast data packet comprising an IP header checksum, an IP multicast address, said first multicast group identified by a first IP multicast address;

determining if said first multicast group is merged with a second multicast group identified by a second IP multicast address;

if said first multicast group is merged with said second multicast group, duplicating said multicast data packet to form a merge multicast packet;

replacing said IP multicast address of said multicast data packet with said second IP multicast address in said merge multicast packet;

recalculating and modifying the IP header checksum of said merge multicast packet; and routing said merge multicast packet.

33. A method of operating an edge router connecting a sub-network to a packet switched network, comprising:

receiving a multicast data packet for a first multicast group on said sub-network, said multicast data packet comprising an IP header checksum, an IP multicast address, and a payload, said first multicast group identified by a first IP multicast address and said IP destination multicast address of said multicast data packet is said first IP multicast address;

determining if said first multicast group is merged with a second multicast group identified by a second IP multicast address;

if said first multicast group is merged with said second multicast group, directing a merge multicast packet to said second IP multicast group on said sub-network, said merge multicast packet comprising an IP header checksum, a destination IP multicast address, and a payload;

wherein said destination multicast IP address of said merge packet is said second IP multicast address, said IP header checksum corresponds to said merge multicast packet data, and said payload of said merge multicast packet is identical to said payload of said multicast data packet.

* * * * *